(12) United States Patent
Peng et al.

(10) Patent No.: US 11,221,486 B2
(45) Date of Patent: Jan. 11, 2022

(54) AR HEADSETS WITH IMPROVED PINHOLE MIRROR ARRAYS

(71) Applicant: Auroratech Company, Burlingame, CA (US)

(72) Inventors: Ziqi Peng, San Francisco, CA (US); Andrew F. Kurtz, Macedon, NY (US); Bayley Wang, San Francisco, CA (US); Weicheng Yan, Vancouver BC (CA)

(73) Assignee: Auroratech Company

( * ) Notice: Subject to any disclaimer, the term of this patent is extended or adjusted under 35 U.S.C. 154(b) by 52 days.

(21) Appl. No.: 16/708,391

(22) Filed: Dec. 9, 2019

(65) Prior Publication Data

US 2020/0183169 A1 Jun. 11, 2020

Related U.S. Application Data

(60) Provisional application No. 62/853,092, filed on May 27, 2019, provisional application No. 62/777,689, filed on Dec. 10, 2018, provisional application No. 62/777,699, filed on Dec. 10, 2018.

(51) Int. Cl.
  *G02B 27/01* (2006.01)
  *G02B 5/10* (2006.01)
  *F21V 8/00* (2006.01)
  *G02B 26/10* (2006.01)

(52) U.S. Cl.
  CPC .......... *G02B 27/0172* (2013.01); *G02B 5/10* (2013.01); *G02B 6/0055* (2013.01); *G02B 27/01* (2013.01); *G02B 27/017* (2013.01); *G02B 26/105* (2013.01); *G02B 2027/011* (2013.01); *G02B 2027/013* (2013.01); *G02B 2027/0116* (2013.01); *G02B 2027/0174* (2013.01)

(58) Field of Classification Search
  CPC .............. G02B 26/105; G02B 27/0172; G02B 27/017; G02B 27/01; G02B 5/10; G02B 5/08; G02B 6/0055; G02B 6/0033; G02B 6/005
  USPC ....................................................... 359/631
  See application file for complete search history.

(56) References Cited

U.S. PATENT DOCUMENTS

| 10,746,998 | B2 * | 8/2020 | Machida | G02B 27/0006 |
| 10,782,532 | B2 * | 9/2020 | Amitai | G02B 6/34 |
| 2016/0313562 | A1 * | 10/2016 | Saisho | G02B 27/0179 |
| 2017/0242251 | A1 * | 8/2017 | Border | G02B 5/30 |
| 2018/0149873 | A1 * | 5/2018 | Edwin | G02B 6/0016 |
| 2018/0210207 | A1 * | 7/2018 | Machida | G02B 6/0038 |
| 2018/0292652 | A1 † | 10/2018 | Ha | |
| 2020/0089001 | A1 * | 3/2020 | Amitai | G02B 27/0172 |

(Continued)

FOREIGN PATENT DOCUMENTS

CN 108132538 A † 6/2018

*Primary Examiner* — William R Alexander
(74) *Attorney, Agent, or Firm* — Smith Tempel Blaha LLC; Gregory Scott Smith

(57) ABSTRACT

Augmented reality headsets. A plurality of tilted pin-mirrors imbedded between an inner surface and an outer surface of a combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box.

11 Claims, 17 Drawing Sheets

(56) References Cited

U.S. PATENT DOCUMENTS

2020/0111259 A1* 4/2020 Sears ................ G06F 3/012
2020/0183152 A1* 6/2020 Pennell ............ G02B 27/0075

\* cited by examiner
† cited by third party

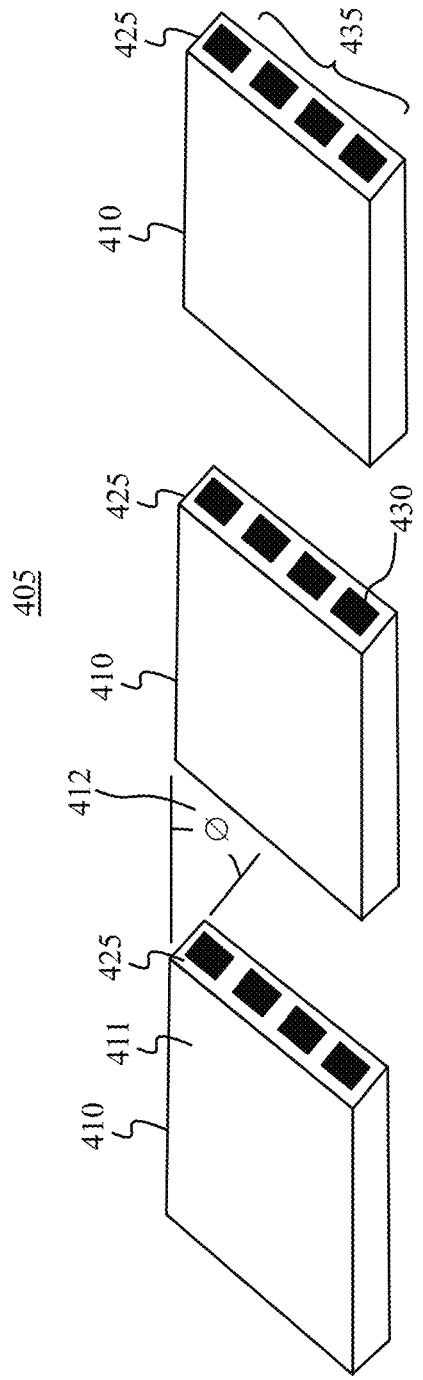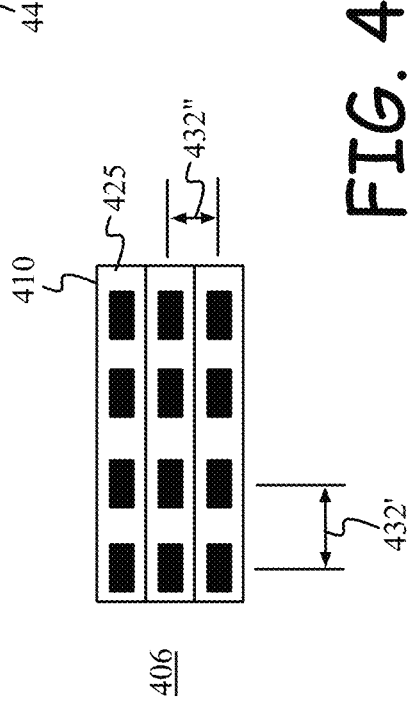
FIG. 4A
FIG. 4B

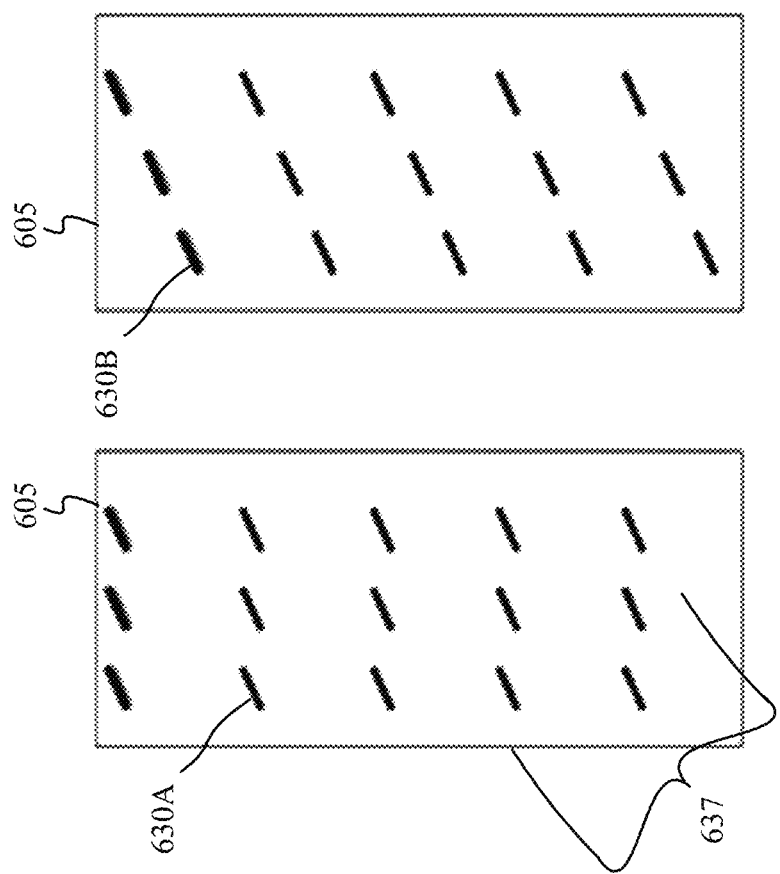

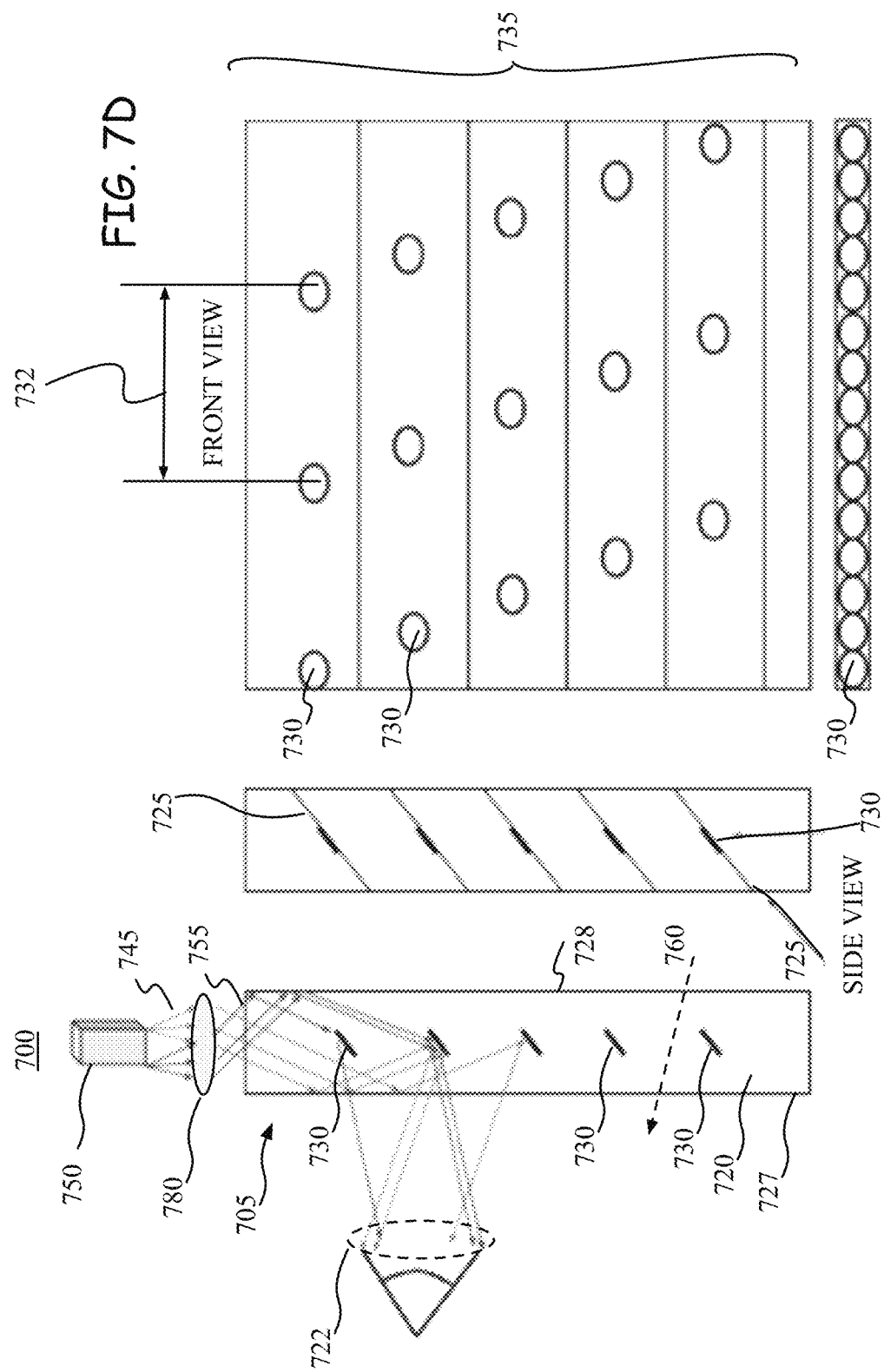

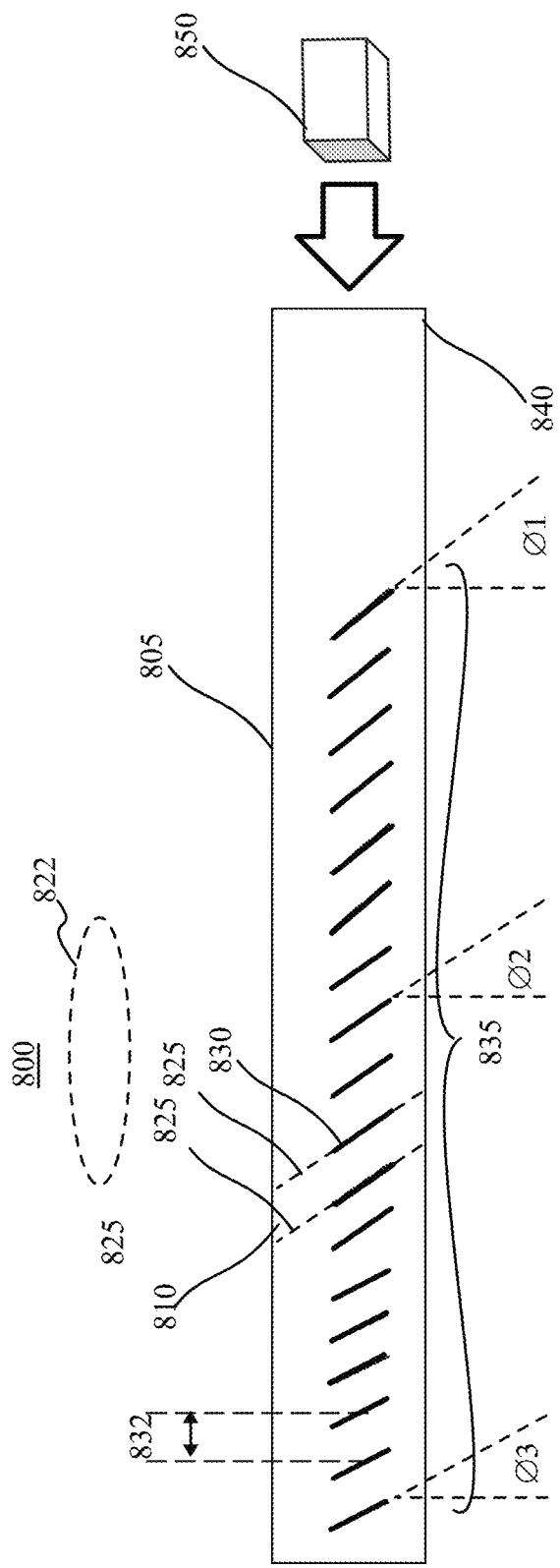

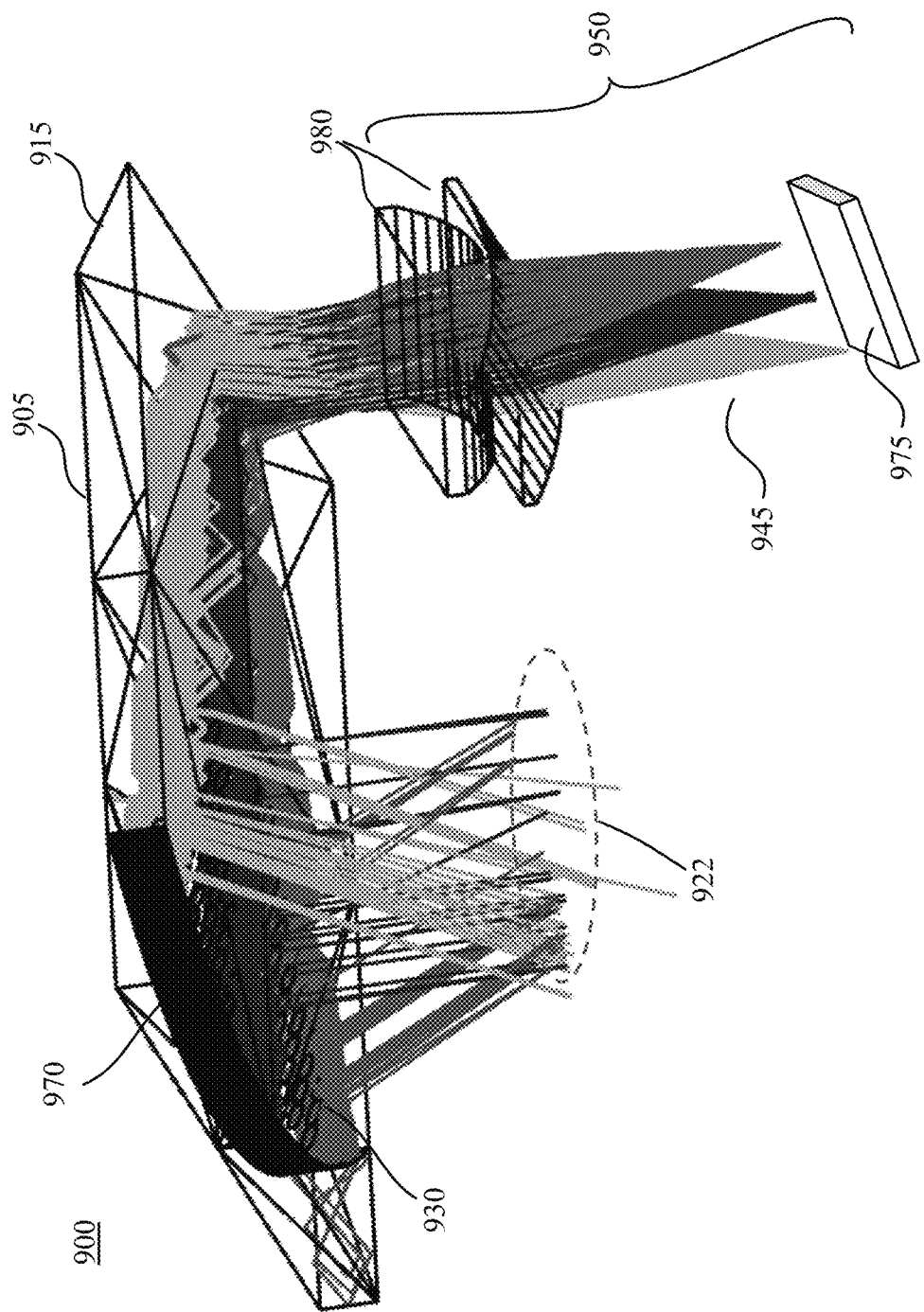

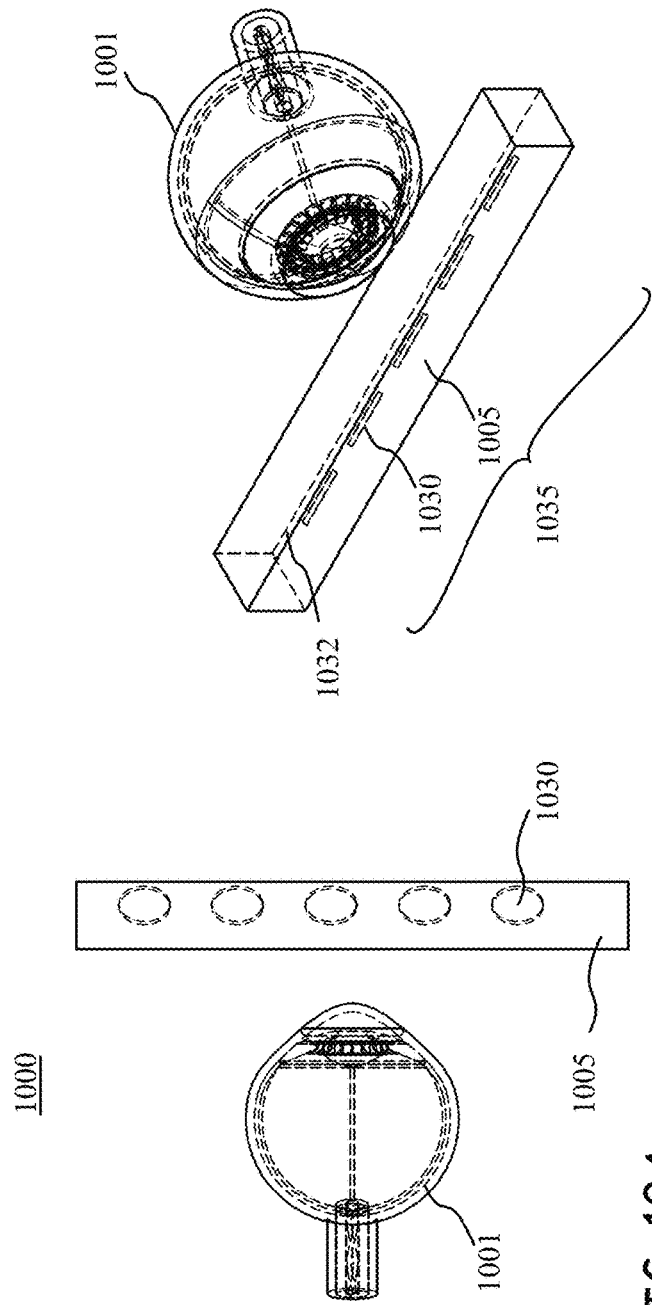

AR HEADSETS WITH IMPROVED PINHOLE MIRROR ARRAYS

BACKGROUND

As computer technology is migrating in sophistication, complexity, power and realism, one could say that the ultimate goal is to create a computerized human being. As this process is unfolding before our eyes, the humans are not sitting idly by just watching, but rather, they are also taking steps toward entering a computerized world. We have seen this in the distance past with the creation of the Six Million Dollar Man as well as the migration of Sci-Fi movies like the Matrix and Ready Player One. Maybe someday we will live in a world where the computer and mankind are fully joined, but in the meantime, the human venture into the computer world is being played out in the virtual reality and augmented reality technologies.

Virtual reality (VR) is an interactive computer-generated experience taking place within a simulated environment. This simulate environment often include audio and visual elements, as well as other elements such as sensory feedback (vibrations, motion, smells, temperature and touch (haptics)). The VR immersive environment can be similar to the real world or it can be fantastical, creating an experience that is not possible in ordinary physical reality.

Augmented reality (AR) systems may also be considered a form of VR. The main different between AR and VR is that AR that layers virtual information over a live camera feed or actual visualization of one's environment with the eye giving the user the ability to view three-dimensional images integrated into his or her real world.

At present, there are two primary architectures for implementing AR glasses. In a first version, image light is incident to the inside face of a curved combiner, and then redirected towards the eye box. In order to provide nominally collimated image light to the viewer for all field points, the combiner can have an extreme shape, particularly if a large field of view (FOV) is sought. In such systems, it can also be difficult to fit the optics on the temples, next to the head, while having the image light rays steer clear or miss hitting the side of the face. In a second version, such as the MICROSOFT HOLOLENS, the image light is directed into an edge of a flat waveguide or light guide, through which it propagates, until it is extracted or redirected by output coupling optics towards a viewer's eyes. Use of such waveguides can advantageously reduce the volume needed for the optics, but the diffraction gratings used for light coupling can create both chromatic and stray light image artifacts. Also, at present, the migration to AR is plagued with limitations, including the cost of the equipment, the size, bulkiness or weight of the equipment, and the limited functionality of the equipment.

Another problem that is particularly evident in AR is that with the real-world images combined with the virtual images, a user may have trouble focusing. From an optical perspective, everyday objects are a myriad of points of light-emitting rays that, after penetrating the pupil of the eye, form an image on the retina. According to the laws of geometrical optics, when the optical system of the eye is well focused, each point of light in the object forms a point of light in the retinal image. In reality, the image is not a simple point, because the physical factors of diffraction and interference distribute the light across the retina.[1]

[1]Larry N Thibos, Cameron A Thibos *US Ophthalmic Review*, 2011; 4(2): 104-6 DOI: http://doi.org/10.17925/USOR.2011.04.02.104

FIG. 1 depicts optical and imaging effects of pinhole glasses. When the optical system of an eye 100 is misfocused on an object 115, the image of any single point of light is uniformly spread out across a small area of retinal surface. As illustrated in FIG. 1, the shape of the pupil 110 of the eye 100 determines the shape of the blurred retinal image. Given that the shape of the pupil 110 in the normal human eye 100 is circular, the image is a circular region called a 'blur circle' 120 or 'blur disk'. By comparison, the eye of a cat has a vertically elongated pupil, so the retinal image would be a 'blur ellipse'. The human pupil also takes on an elliptical appearance when viewed from the side, so the blurred image in peripheral retina is also a 'blur ellipse'. Some animals have a pupil that forms two small pinholes, which would produce a pair of small blur disks for every object point, a natural example of monocular diplopia.[2]

[2]IBID

Pinhole glasses, also called stenopeic glasses, are eyeglasses with lenses that consist of many tiny holes filling an opaque sheet of plastic. These "pinholes" block indirect rays from entering the eye, thus preventing them from distorting your vision. While this does not actually improve the focusing ability of the eye, it does reduce the size of the blur circle on the back of the retina, so reasonably clear vision may be achieved.[3] However, while viewing through a single pinhole can improve resolution, within the trade-off of aberration blur versus diffraction blur, the resulting image will be dim. By comparison, stenopeic glasses with multiple pinholes increase the vision angle and the amount of light that reaches the retina. If two pinholes are separated by less than the diameter of the pupil aperture, two pencils of ray coming from one light point pass through the pupil and form two nearby retinal images. Optimization is necessary, as using too large of a separation will result in dead spots in the field, while too small of a separation will produce multiple images.

[3]Using Pinhole Glasses for Vision Improvement, https://www.verywellhealth.com/do-pinhole-glasses-work-3421901 By Troy Bedinghaus, OD Updated Oct. 8, 2017

Thus, there are yet opportunities for improved wide FOV AR glasses or headsets that have better optical designs and performance, including approaches that provide enhanced resolution or smaller blur circles.

SUMMARY

The present disclosure is related to augmented reality headsets and more particularly light guided augmented reality (AR) display that include an image source and imaging optics. The imaging options provide an image light. The AR display also includes a combiner into which the image light is end or edge coupled, and from which the image light is guided and output towards an eye box. A plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box. With respect to the image light, the tilted pin-mirrors appear to form a high fill factor array, while simultaneously appearing as a low fill factor array for ambient light incident to an outer side surface of the combiner. These and other embodiments, features, aspects and benefits are described more fully in the detailed description with the accompanying drawings.

BRIEF DESCRIPTION OF THE DRAWINGS

FIG. 4A depicts a concept for pin mirror arrays for use in AR headsets.

FIG. 4B depicts a concept for pin mirror arrays for use in AR headsets in a stacked configuration.

FIG. 6A depicts a potential orientation of the pin-mirrors in a pin-mirror array.

FIG. 6B depicts a potential orientation of the pin-mirrors in a pin-mirror array.

FIG. 7A depicts side view of portions of an improved light-guide type AR headset, including image light propagation through a combiner or eye piece with a pin-mirror array.

FIG. 7B depicts a side view of the embodiment of FIG. 7A with more detail showing the slice edges.

FIG. 7C depicts top side view of portions of an improved light-guide type AR headset of FIG. 7A.

FIG. 7D depicts top front view of portions of an improved light-guide type AR headset of FIG. 7A.

FIG. 8 depicts a cross-sectional view of the pin-mirrors within a combiner, to illustrate a spatial variation of the pin-mirror tilt.

FIG. 9E is a perspective view of the pin-mirror based light guide AR headset of FIG. 9A with light paths illustrated.

FIG. 10A depicts a viewer's eye receiving virtual image light from part of an AR headset having pin-mirrors.

FIG. 10B depicts a viewer's eye receiving virtual image light from part of an AR headset having pin-mirrors.

FIG. 10C depicts a viewer's eye receiving virtual image light from part of an AR headset having pin-mirrors.

DETAILED DESCRIPTION OF EXEMPLARY EMBODIMENTS

The present invention, as well as features and aspects thereof, is directed towards providing an optical solution that utilizes pin-hole technology to reduce the blur circle for AR solutions, such as AR Headsets (ARHS).

A virtual image is an image that from the user's perspective, is not projected on a screen but rather appears to be present in space. Thus, in an AR system, virtual images are generated to give the appearance of existing in the user's real-world space.

A good tutorial of this field of art can be found in United States published patent application US20100290127A1, which is summarized in the next few paragraphs.

A virtual image is different from a real image and the images are formed differently as well. A real image is an actual image that can be observed directly by the unaided human eye. A real image is present in the real world and the image is perceived by the human eye when light bouncing off of the image enters into the eye through the pupil and lands on the retina wall within the eye. Thus, a real image is a perception of a physically existing object at a given location. An example of a real image is a photograph. Real images can be created electronically with devices such as cathode ray tubes (CRT), liquid crystal displays (LCD) screens, liquid crystal on silicon (LCOS) devices, digital micro-mirror display devices (DLP or DMDs), lasers, super luminescent diodes (SLEDs), and organic light emitting diode (OLED) displays. The OLED is an example of an electronic display that provides a real image. The size of the display surface limits the size of the real image that can be provided to the observer.

Virtual image displays provide an image that is not observable on a physically existing viewing surface or in a tangible world. The virtual image is formed at a location in space where no display surface exists. An example of creating a virtual image is when someone looks at small items through a magnifying glass. The magnifying glass makes the image appear larger and the image also appears to be located substantially behind the surface where the item actually exists. Thus, while the item is a real image, the magnification of the item is a virtual image. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

Figure 1:
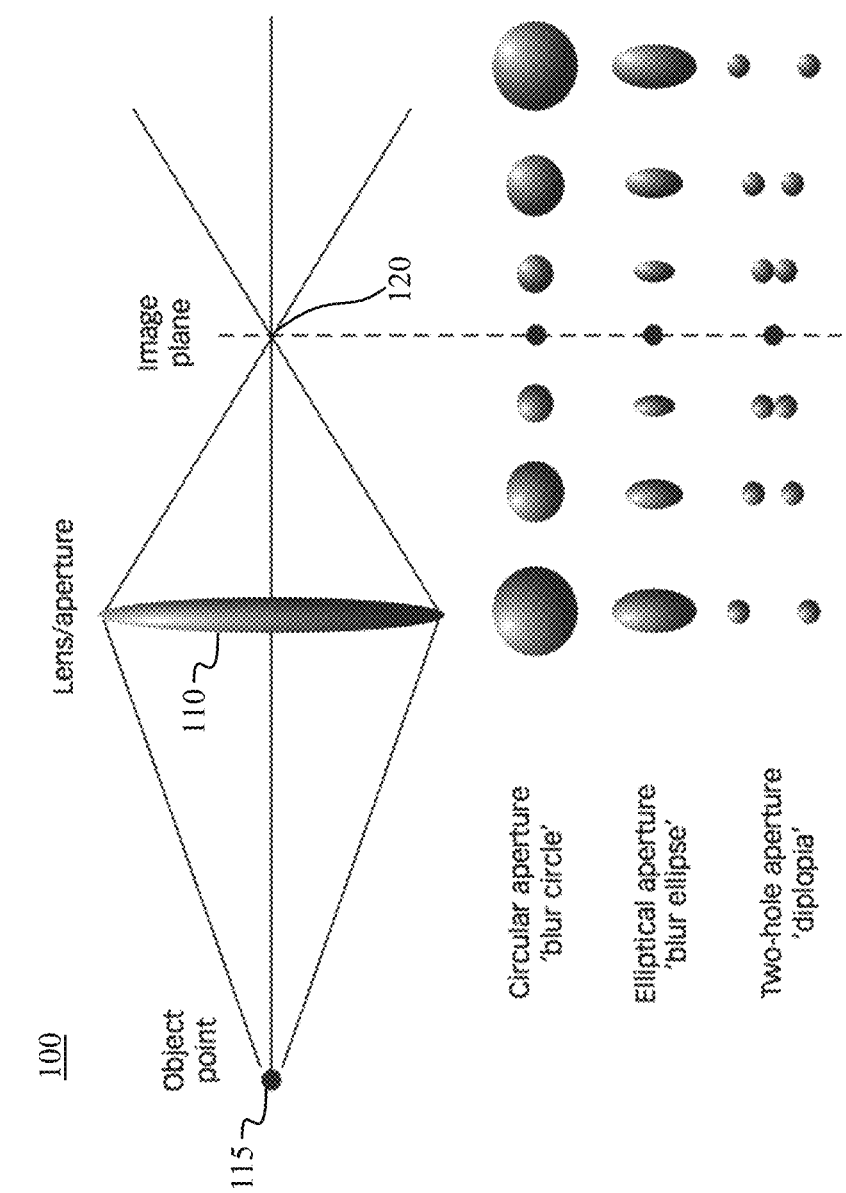
FIG. 1 depicts optical and imaging effects of pinhole glasses.
Figure 2:
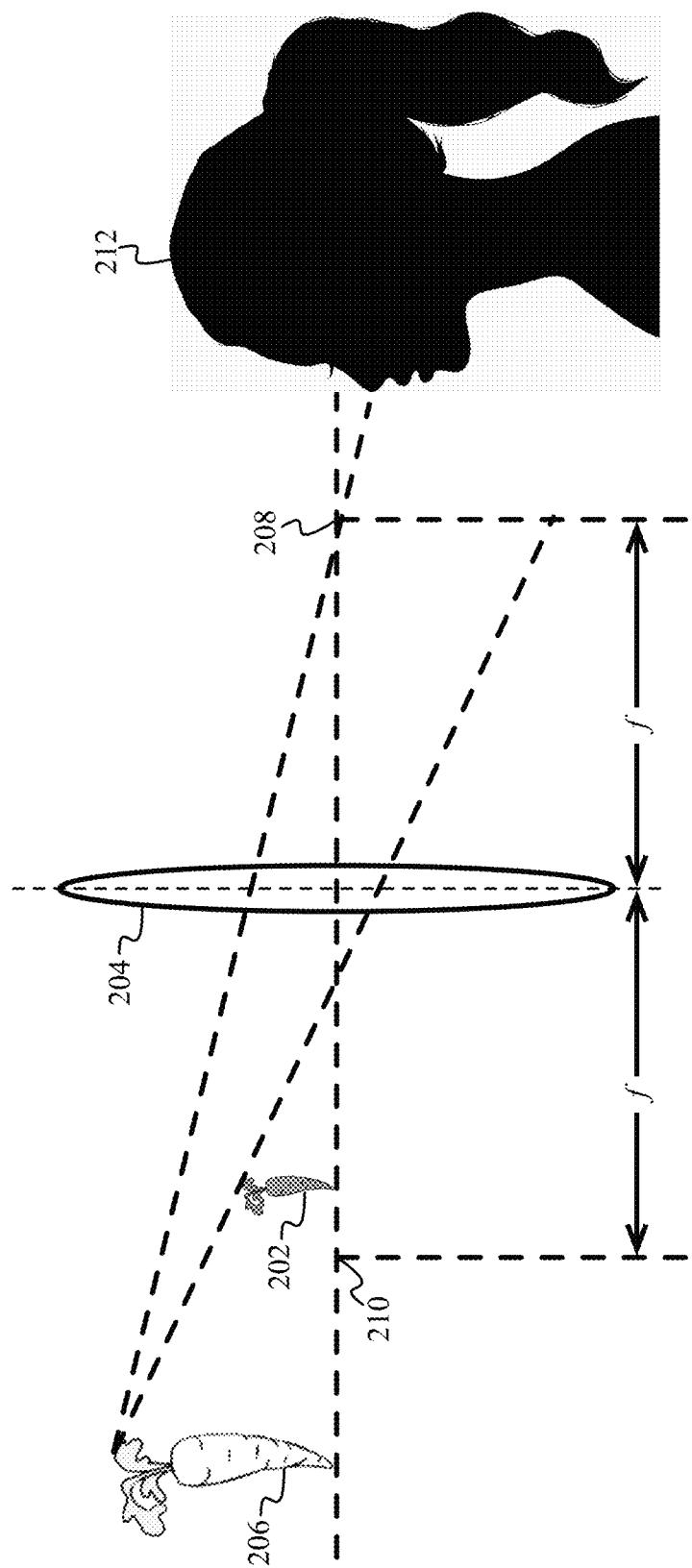
FIG. 2 depicts the concept of virtual images.

FIG. 2 depicts the concept of virtual images. Further, FIG. 2 illustrates how a virtual image can be created by viewing an object 202 through a magnifying lens 204. The object 202 is placed within the focal length 210, or f of a magnifying lens 204. The virtual image 206 that is formed appears to the viewer at point 208 and is enlarged and has the same orientation as the source object 202. As a result of this type of image formation, the size of the virtual image 206, as perceived by the viewer 212, is limited by the magnification of the display system as opposed to the size of the electronic display. This enables virtual image displays to be designed that provide the same amount of information per screen as real image displays, yet occupy a smaller space.

Thus, it can be appreciated that an optical system is used to create a virtual image. As such, the eye and the viewing surface properties of a real image are the factors that determine the viewing parameters, whereas in a virtual image display, the optical system determines most of the viewing parameters.

In the creation of an AR environment, especially one that is created through the use of a viewing headset, light waves enter the pupil of the eye from the real environment as well as from the virtual image generating optic system. In an AR headset (ARHS), a real image that serves as the source object is first formed by an imaging component that is electronically energizable to form an image from image data. In embodiments of the present invention, an OLED or other emissive display device is utilized to create a real image and then, a virtual image is then created through an optical system. Obviously, within an ARHS, the imaging source needs to be small and inexpensive in order to reduce the size and overall cost of the ARHS. But it should be understood that while OLEDs can be utilized, other image sources may also be utilized, such as LCDs, etc. The optic system then forms a virtual image of the real image generated by the source, or OLED in the described embodiments. The virtual image is then seen by the viewer along with the actual real world in which they are located.

Figure 3A:
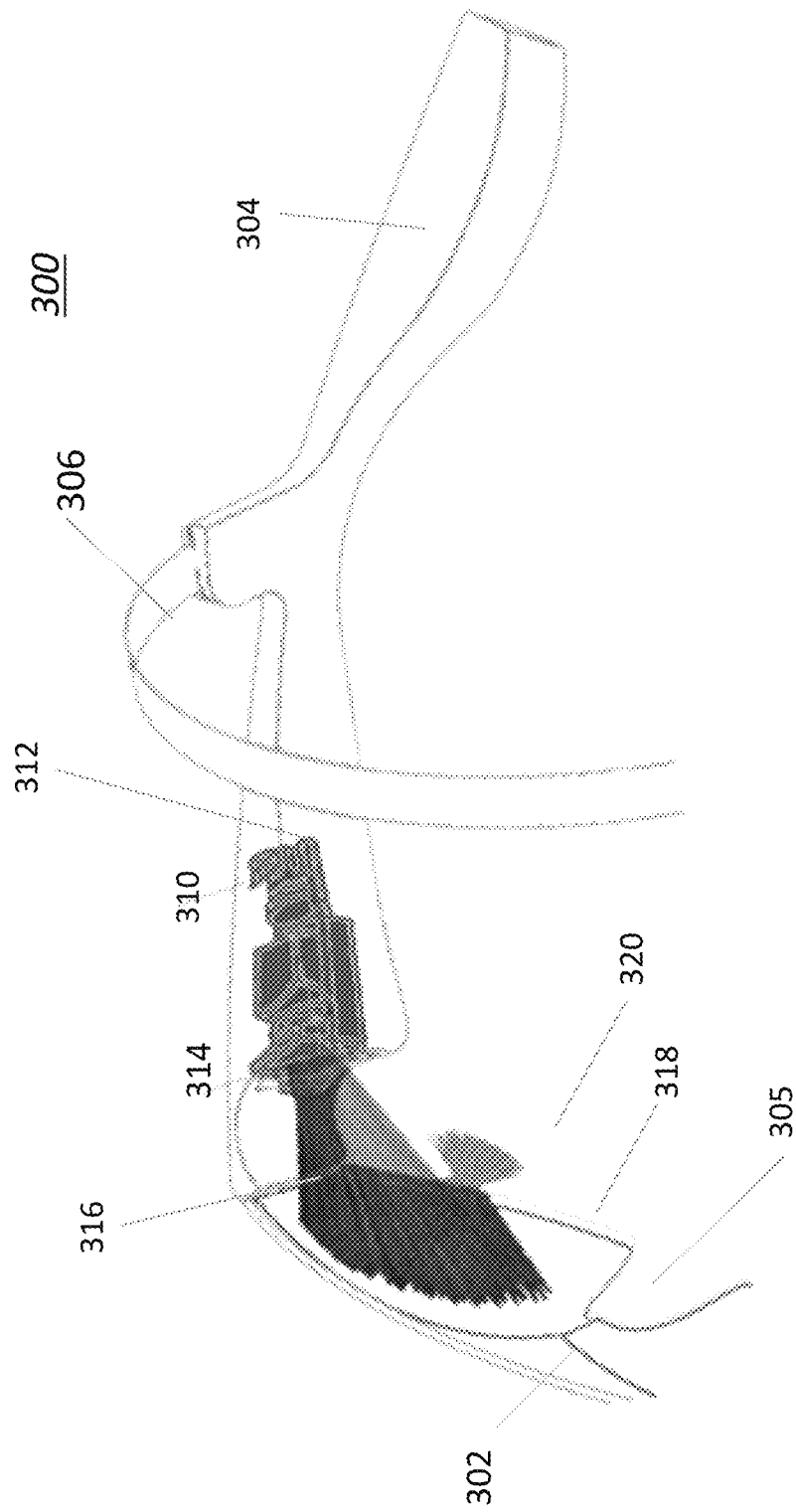
FIG. 3A depicts an exemplary projection type AR headset.
Figure 3B:
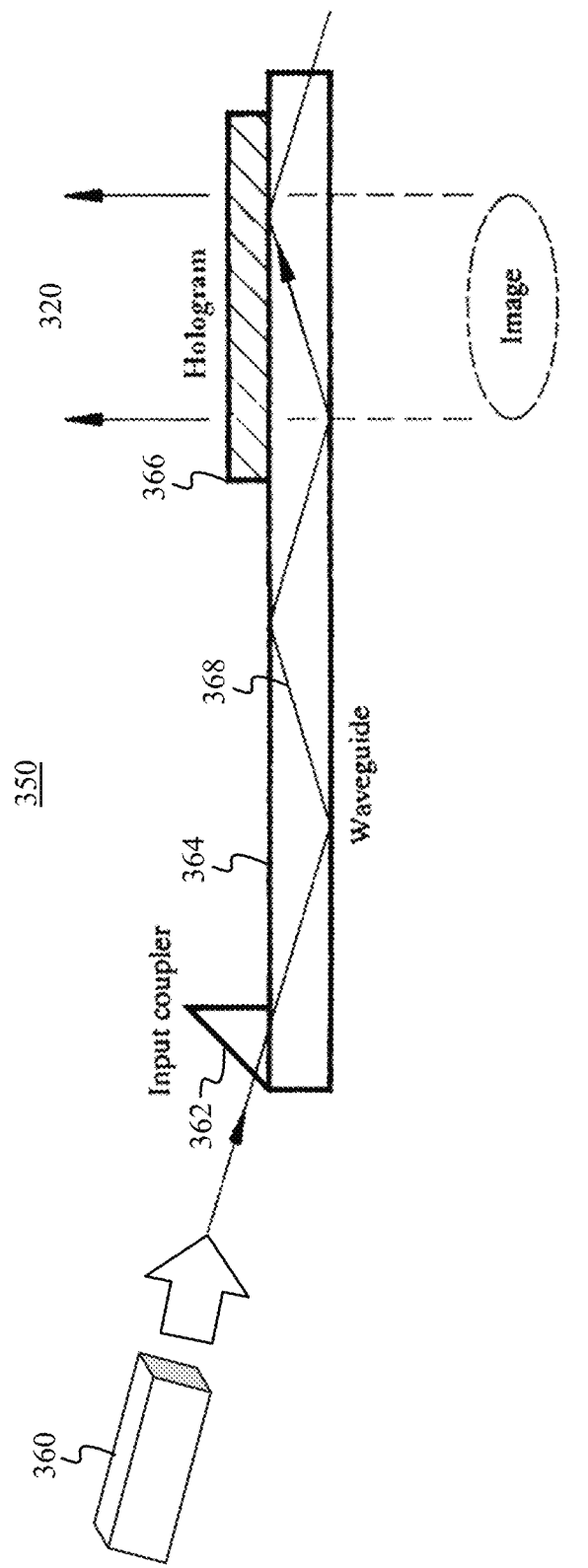
FIG. 3B depicts an exemplary light guide type AR headset.

FIG. 3A depicts an exemplary projection type AR headset. FIG. 3B depicts an exemplary light guide type AR headset. FIG. 3A depicts a portion of an exemplary projection type Augmented Reality headset 300, in which incident light reflects off the inner or inside surface of a combiner, towards a viewer's eye. This ARHS display includes a frame 302 with a right arm or temple 304 and a strap 306 that can be used to secure the ARHS 300 to a user's head. A comparable system (not shown) is typically provided for the left eye. Depending on the weight of the ARHS, the strap 306 that extends over the top of the head and/or behind the neck may or may not be needed to provide additional support. The headset rests on a viewer's nose with enough offset, or eye relief, of the combiners from the viewer's eyes so as to be comfortable.

In particular, as shown in FIG. 3A, a projection type ARHS can include virtual image generating optics 310 on the right temple 304. The image generating optics 310 can include a LED display 312, imaging optics 314, and a variable opacity combiner 316, that together provide and direct visible AR image light to a viewer's eye. In particular, the image light provided by the image generating optics that is directed towards the visor or combiner 316, hits the inner surface 318 of the combiner, between a temple 304 and the nose bridge 305, and reflects back towards the user's eye, or a target area or eye box 320 nominally overlapping with the expected eye position. An eye box is defined as the volume of space within which an effectively viewable image is formed by the ARHS display, and it represents a combination of an exit pupil size and an eye relief distance. Nominally, the exit pupil size is assumed to be that of human viewer's experiencing photopic light levels (e.g., ≥1.0 cd/m$^2$). Whereas, an eye relief is the distance from the last surface of an eyepiece within which the viewer's eye can obtain the full viewing angle. The visor or combiner 316 is curved and shaped to fit well, or conform to, the shape or contours of a viewer's face.

A second set of image generating optics (not shown in FIG. 3A) likewise can provide image light to a viewer's left eye. The combiner 316, or eyepiece, is referred to as having a variable opacity in part as the amount of ARHS image light that is seen by a viewer depends on the reflectivity of the dichroic coating provided on the inner surface 318 of the combiners 316, while the transmissivity of the combiners also helps determine the amount of ambient or environmental light that reaches a viewer's eyes and the amount of ARHS image light that is lost through the glasses into the ambient environment. Nominally, the dichroic coatings of the combiner are nominally 50% reflective for the visible spectrum, but the reflectivity or transmissivity of the combiners 316 can also vary spatially and angularly over the surface of the combiners.

A typical ARHS 300, such as the MICROSOFT HOLOLENS, can provide image content to a limited FOV per eye of <50°. Ideally, for some viewing applications, a projection type ARHS 300 would support a WFOV per eye in excess of 90°, to as much as 115° or larger, and thus provide content to the user's peripheral vision. In projection type ARHS glasses, the image generating optics 310 would produce a fan of rays that spans an asymmetrical FOV ≥30° in total width, that then intersects with a highly curved combiner (e.g., radius ≥60 mm) having a compound or complex (e.g., aspheric) curvature, to produce nominally "collimated" ray fans directed over a large FOV to an eye box 320 of ≥10 mm in width. This type of ARHS can be difficult to design and make because of the space, weight, and image quality constraints, as well as the difficult design and fabrication specifications for the optics.

FIG. 3B depicts another exemplary type of AR headset 350. In this case, image light from virtual image generating optics 360 is directed into an input coupler 362 and into a wave guide or light guide 364. The image light can then exit towards a viewer's eye via an output coupler 366. The input coupler, which is positioned at or near an end of the light guide, can be a prism, diffraction grating, or edge-lighting mechanism. The light guide for an optical waveguide display is a sheet of transparent material with two surfaces, which are locally parallel and optically polished.

In this ARHS display, the coupled wave or image light is confined inside the waveguide or light guide through total internal reflection (TIR) on the waveguide surfaces and propagates along following a zigzag TIR light path 368. As shown in FIG. 3B, the projection or image generating optics 360, and pre-input coupler 362 edge couple "collimated" image light into the plane of the light guide, and convergent focused image light in the plane vertical to the light guide. In the latter case, the image light can be convergent at ~F/4, at a distance just inside (from the input coupler) the waveguide of about 23 mm, with a tilt beyond the critical degree, such as ~70 degrees from the surface normals. The image light can then TIR its way through the light guide(s) to the diffraction grating output coupler(s). A hologram or diffraction grating is placed parallel to and immediately in contact with the waveguide. When the grating is illuminated with the guided wave, the image light is directed to a viewer's eye, enabling the viewer to see a virtual image.

In one version, the complete FIG. 3B system has three light guides arranged in parallel; one per color (RGB). Similar systems, with one or three waveguides, can be used to provide image light to a viewer's other eye. As compared to the ARHS 300 of FIG. 3A in which image light is directed onto the highly curved inner surface 318 of the combiner 316, the use of waveguides can enable a smaller ARHS 350 with simpler imaging optics. The MICROSOFT HOLOLENS glasses are one commercially available example of this type of glasses.

However, projecting image light in and out of this light guided system introduces its own set of problems, particularly with regards to the "diffraction gratings". As the waveguides are heavily wavelength dependent, this type of glasses is typically made with three separate waveguides with three separate sets of gratings to handle each of the RGB colors. This separation, along with their display system, can lead to a user seeing the virtual images separated into their color components. Another side effect for the lightguide type of ARHS, is that when a viewer's head is moving, a white spot (combined by R+G+B) can be seen as separated into three separated RGB spots. A further side effect is that when a user is directly viewing a bright light source from the ambient real environment, the diffraction grating can cause some ghost images. Also, the gratings can also redirect and disperse stray ambient light and create additional artifacts, not related to either the displayed virtual image or the real scene.

FIG. 4A depicts a concept for pin mirror arrays for use in AR headsets. FIG. 4B depicts a concept for pin mirror arrays for use in AR headsets in a stacked configuration. A variety of improved AR headsets using novel pin-mirror based combiners, which are also referred to as eyepieces or visors, are disclosed. According to an embodiment of the present invention, as shown in FIG. 4A, a novel type of improved light guide combiner 405 can be made of adjacent or interlocking slices 410 of transparent glass or polymer, with at least one row or one dimensional (1D) array or linear array of reflective surfaces or pin-mirrors 430 to form part of a pin-mirror array 435 that are fabricated along tilted edge faces or facets 425 of a slice 410. The nominally preferred facet tilt angle Ø 412 is 45° relative the flat sides 411 of the slices 410 as a non-limiting example but it is appreciated that other angles may also be utilized. A series of pre-fabricated slices 410 can then be assembled along the x-axis to form a larger flat combiner 406 providing a two-dimensional (2D) pin-mirror array of imbedded tilted reflectors (pin-mirrors 430). The individual small mirror areas in FIG. 4B, which are positioned relative to another by a center to center pitch 432' and 432" (collectively referred to as 432), or are separated from each other by edge to edge gaps, can be optimized to be spaced with nominally the same or different pitch or gaps in the horizontal and vertical directions. Although the pitch 432' and 432" varies by design, and can vary spatially within a design, the pitch 432' and 432" can be equal or different, and is most commonly is in 4-6 mm range. The pin-mirrors 430 are reflectors, which can be provided with a metal coating, such as of aluminum or silver, or as a multi-layer dielectric or dichroic thin film coating, and for example, provide ~80-96% local reflectivity, depending on the coating type. Although the pin-mirrors 430 are nominally fabricated with broadband visible reflective coatings, notch type dichroic coatings, that reflect a set of narrow (e.g., ≤25 nm wide) RGB spectral bands can also be used. As these notch type coatings can allow ambient light outside of the narrow reflection bands to pass through the pin-mirrors to the eye box, the optimization of the efficiency of the ambient light transmission can be desensitized relative to the optimization of the size and spatial density of the pin-mirrors 430.

Considering FIG. 4A and FIG. 4B in greater detail, the combiner 405 can be made with interlocking slices 410 of glass or plastic, whose tilted edge facets 425 are coated partially or completely using materials to provide a partially transparent or completely reflective surface. The mirrored facets can then be coated with an index-matching adhesive, and stacked sequentially to form a larger combiner 406, for which the non-mirrored surfaces form uniform, optically-continuous segments. For greater mechanical stability, the slices 410 can also be assembled onto a larger substrate 440, which can be provided on either side of the combiner 406, towards or away from the viewer's eyes. Once a combiner is assembled with imbedded micro-mirrors or pin-mirrors 430, the outer surfaces of the combiner 406 can also be fabricated with anti-reflection (AR) coatings or other coatings to improve the optical quality of the assembly.

As another example, an improved combiner with pin-mirrors 430 can be fabricated by cutting a row of grooves partially into a substrate material to provide the tilted edge facets 425. The pin-mirrors 430 or micro-mirrors can then be deposited or coated in either a linear or 2D array within the grooved facets 425. To imbed the pin-mirrors 430, the grooves can then be filled with an inserted compensating piece of substrate material, or with adhesive, or with a 3D printed volume of index matched material. Alternately, a second substrate with matching protruding faceted ridges can be overlaid on the first substrate, so the ridges fill the faceted grooves. The two substrates can be fused together, or attached by adhesive, or a second equivalent substrate can be cast or molded over the first one. As a further alternative, the reflective coatings for the pin-mirrors 430 or micro-mirrors can be deposited or formed on protruding ridges provided on a substrate, and a second grooved substrate, or a set of slices, can be used to fill in the spaces between the ridges, and to create an overall combiner 405 with smooth external surfaces (inner surface 427 and outer surface 428).

Figure 5A:
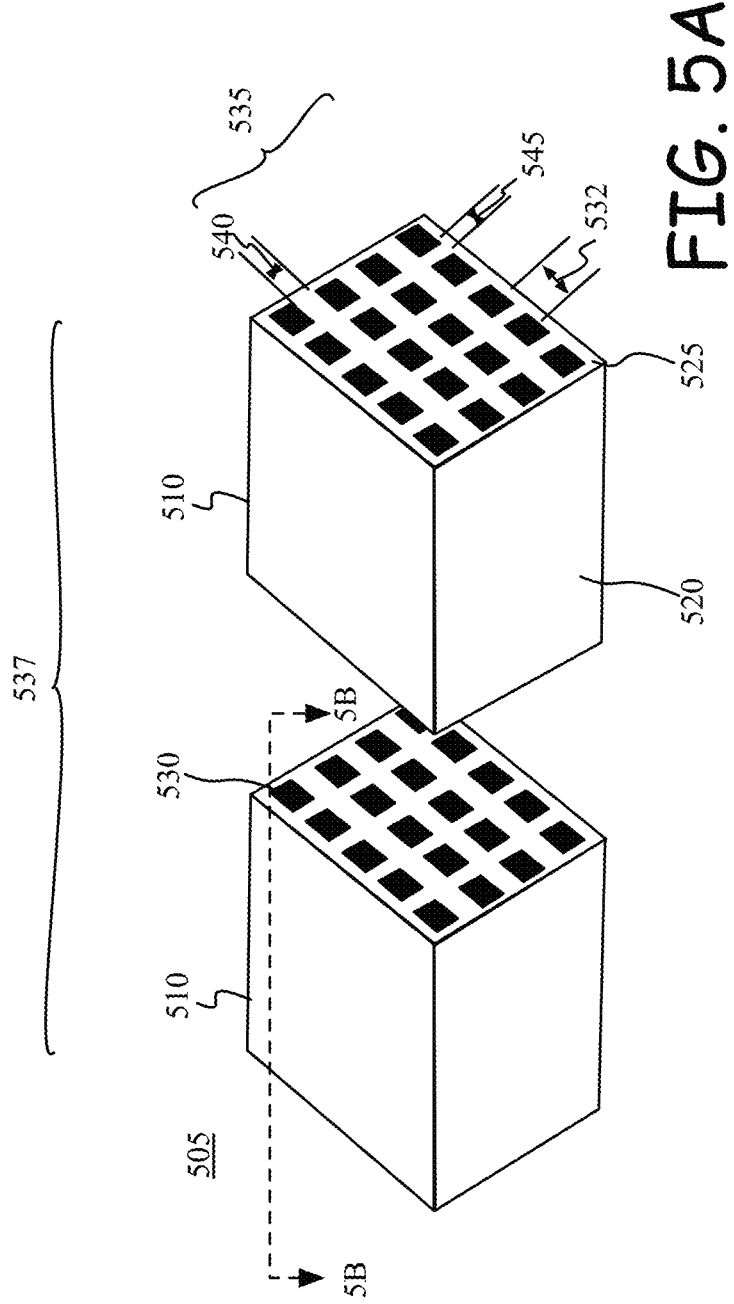
FIG. 5A depicts a second concept for pin mirror arrays for use in AR headsets.
Figure 5B:
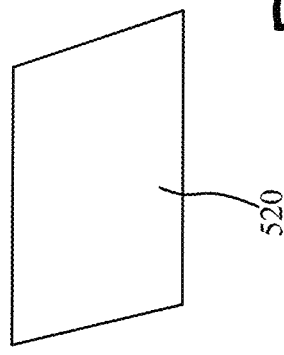
FIG. 5B presents a cross-sectional view of the pin mirror array of FIG. 5A taken line 5B-5B.
Figure 14:
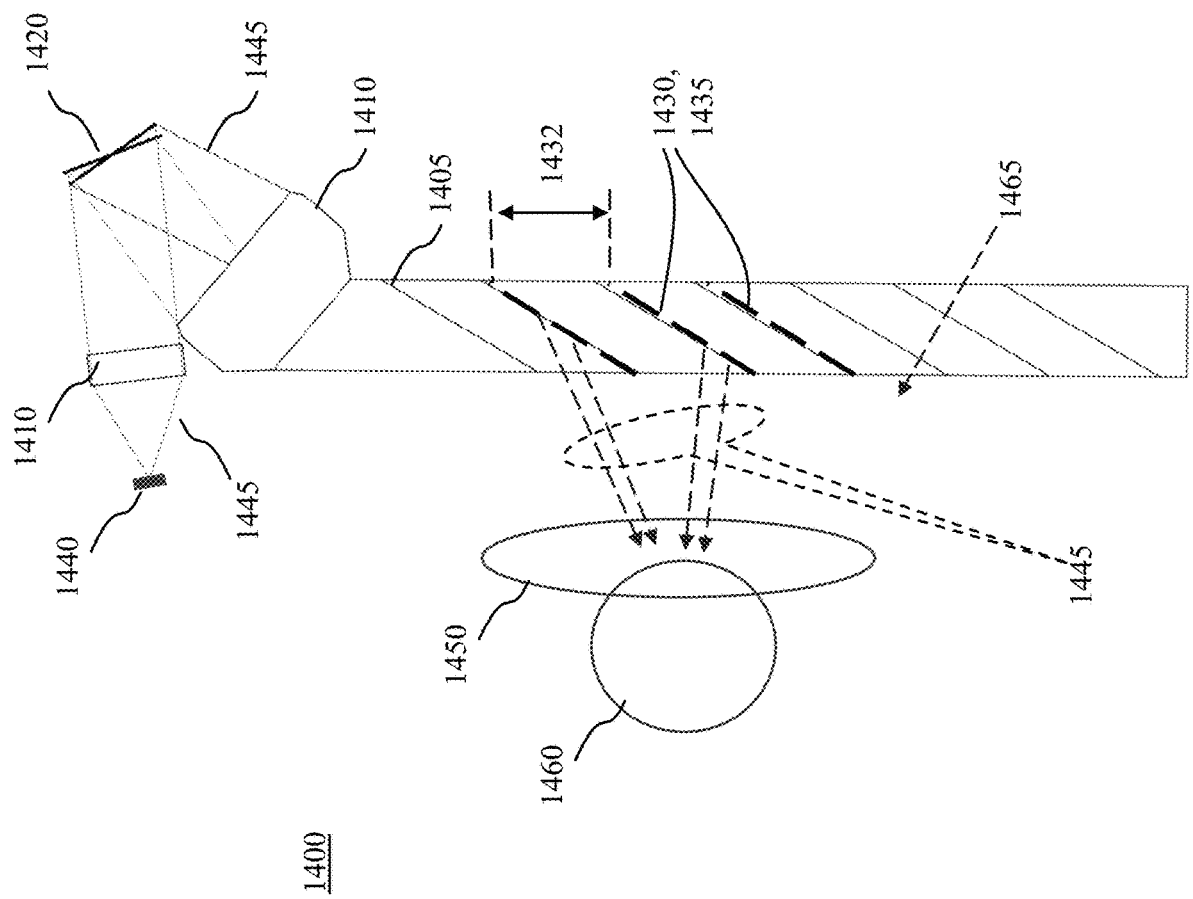
FIG. 14 depicts a fourth improved AR headset, of the light-guide type, having a scanning image light source and a plurality of pin-mirrors.

FIG. 5A depicts a second concept for pin mirror arrays for use in AR headsets. FIG. 5B presents a cross-sectional view of the pin mirror array of FIG. 5A taken line 5B-5B. As such, an alternate configuration for the improved combiner is depicted in FIG. 5A and FIG. 5B, in which multiple rows of tilted reflectors or pin-mirrors 530 are fabricated on a tilted facet 525 of a slice 510 to form part of a pin-mirror array 537. Multiple such slices can then be assembled into part of a larger combiner 505 providing a larger 3D pin-mirror array 537 of tilted pin-mirror sub-arrays 535 of pin-mirrors 530 are provided on an imbedded surface within a combiner 505405. While FIG. 5A and FIG. 5B depict this type of combiner or eyepiece before the slices and sub-arrays are assembled into the combiner, FIG. 14 depicts an improved ARHS (1400) with an assembled combiner of this type, including a pitch 1432 between sub-arrays. A variety of related parameters, including the extent of the sub-arrays 535, the pitch 532 between the pin-mirros, the gaps 540 and gaps 545 between the pin-mirrors, the parallelism or relative skew or tilt between the sub-arrays, the curvature of the sub-arrays, and the pin-mirror patterning within or between the individual sub-arrays (including in-plane offsets), can be optimized. For example, the pin-mirror pitch or a pin-mirror sub-array positioning or offset can be varied spatially from one sub-array to the next, so as to optimize the apparent fill-factor for the transiting image light.

FIG. 6A depicts a potential orientation of the pin-mirrors in a pin-mirror array. FIG. 6B depicts a potential orientation of the pin-mirrors in a pin-mirror array. Also, as presented in example in FIGS. 6A and 6B, the orientation of the rows of pin-mirrors 630A can seem to be in a row, or a tilted row 630B depending on how the assembled part is viewed. This is made clearer in FIG. 7(A-D), where an improved light guide type AR headset 700 is shown in cross-section, and both the side and end views of a combiner 705 are depicted along with illustrations of propagating image rays. As shown in FIG. 7(A-D), as seen from the inner or outer surface, an assembled combiner 705 looks like a nominally transparent member with a 2D array of pin-mirrors 730. Whereas, as seen best in the side view, the assembled combiner looks like a narrow structure with imbedded angled mirrors 730. When a combiner 705 is assembled using these slices, the overall combiner structure can provide several "columns" of reflectors, as long as the rows or columns don't block each other (see FIG. 6B). This is in contrast to the left image (FIG. 6A), where the pin-mirrors 630 could block each other, in terms of the paths to an eye box 720. As seen on FIGS. 6A and 6B, the number of pin mirror layers along x-z plane is dependent on the thickness of the eyepiece. Two or three layers can be preferentially selected if the nominal diameter of the pin mirror is optimized to be 2 mm, as a non-limiting example.

FIG. 7A is a top-planar view of an ARHS visor 700 that with a pin-mirror based combiner 705 and virtual image generating optics 750, can be incorporated into an improved AR headset display. The visor 700 receives light rays 760 from the real-world environment as well as light rays 745 from a virtual image source 750. The virtual image generating optics 750 can include an LED or OLED array with a 2D array of light emitting pixels that can emit light in the F/1.5-F/2.5 range. These optics can further include spherical or cylindrical optical elements (e.g., lenses 780 or mirrors) to modify the divergent image light, and nominally collimate this light from a given pixel in at least one direction, and to then direct the light into a visor or lightguide (see FIGS. 9A-E for further illustration of lens elements 780). The visor 700 includes a series of embedded mirrors or pin mirrors 730 that are embedded between an external inner surface 727 and an external outer surface 728 of the visor 700. The beam from each pixel on the image source is nominally collimated by the projection optics and then coupled into the lightguide eyepiece (705), after which is reflected by the embedded mirrors or pin mirrors 730 and coupled out towards an eye box 722 to be visualized by a human eye. As image light from a display pixel interacts with one or more pin-mirrors 730, and light from other display pixels interacts with other pin-mirrors, an aggregate light beam can be directed to the eye box 720. The aggregate light forms a convergent light cone directed to an eye box 720, but image light for any one image pixel is nominally collimated into the eye box. The optics of a viewer's eye can then alter or focus this light so that an image can be perceived. The apparent field of view depends on the angular width of the aggregate cone of light directed into the eye box 720. Although FIG. 7A does not show details of light coupling into the light guide combiner, the preferred techniques are edge coupling, a coupling prism (as in FIG. 4), or using an edge facet (FIGS. 9A-E).

In this display device, image light rays 745 can be coupled into an edge of an improved light guide combiner 705, or eyepiece, from one or more specified input facets or input couplers, and after propagating through a light guide portion 720 of the combiner 705, be reflected by the imbedded pin-mirrors 730 and projected outward towards a viewer's eye. Depending on the directionality of the incoming image light, corresponding to a given image pixel, the light will propagate a shorter or longer distance along the length of the light guide, before interacting with one or more pin-mirrors 730. As shown in FIG. 7A, the light can be directed through the light guide in part by total internal reflection (TIR). FIG. 7A depicts the image light as bouncing once and reaching a target pin-mirror 730, but TIR provides that the light is trapped and can bounce multiple times within a flat light guide portion of the combiner, and likely will do so, around or past part of the array of pin-mirrors before reaching its target pin-mirror(s) 730.

With respect to FIG. 7A, the pin-mirrors 730 are nominally sized to have a real sub-pupil ~0.3-2 mm full width, as compared to the nominal photopically adapted adult maximum pupil width of ~4 mm. A goal is that the individual pin-mirrors 730 are too small for viewers to really see or focus on while the AR glasses are being worn. Also, while the pin-mirrors 730 can be rectangular in shape, as suggested in FIGS. 4A-B, the pin-mirrors 730 are preferentially fabricated to be circular or elliptical in shape, as depicted in FIG. 7C-D. Then, taking the nominal 45-degree tilt of the imbedded facets 725 into account, the nominally flat pin-mirrors can have apparent sizes that can be as small as ½ the real size, and a goal is to have the pin-mirrors 730 appear circular to a viewer's eye. Thus, pin-mirrors 730 having a real elliptical shape, as shown in FIG. 7D, can have a circular appearance with respect to a viewer when tilted. The pin-mirror shape can also be more irregular.

As also shown in FIG. 7D, the pin-mirrors 430 are offset from one another by fairly large gaps within a pin-mirror array 735, that in the direction of light propagation can be as large as 6-10 mm wide, or about 3-5× the width of the pin-mirrors 730. By comparison, for the orientation of the combiner that is orthogonal to the direction of ray propagation, the real gaps can again be about 7-10 mm wide, but as seen from direction of the virtual imaging generating optics 750, the staggered pin-mirror-arrays 735 appear to have little to no apparent gaps. However, from the viewpoint of the ambient light, the gaps between the pin-mirror arrays 735 are sized to allow a significant portion of ambient light rays 760 through the glasses so as to enable an AR viewing experience.

In use, image light rays 745 emanating from a given image pixel of the image generating optics 750 experience or interact or reflect off at least one pin-mirror 730 and preferably several, but each pin-mirror 730 re-directs light for a multitude of pixels towards the eye box 722. Depending on the design of the combiner 705 and the AR headset 700, a pin-mirror array 735 within a combiner 705 can have a total pin-mirror array size of 20-30 pin-mirrors 730 per eye, and maybe as many as 100 total pin-mirrors 730. The pin-mirror array size can also be expressed as the total area (see FIG. 7D) of a combiner that includes pin-mirrors, which can for example span a 50 mm width and 40 mm height. Also, since the size of the pin mirrors 730 are rather small, the transparency of the glasses for ambient light can be maintained as well. However, as compared to the conventional AR headset of FIG. 3B with diffraction grating light output couplers, which have optical features on the micrometer or nanometer scale, these pin-mirrors are relatively large (millimeter scale) and do not cause significant diffractive effects. Image light reflected by the pin-mirrors 730 will be directed to a viewer's eye, while ambient light rays 760 from the broader environment that the viewer resides in, can transit the gaps between the pin-mirrors, to reach a viewer's eyes. The image light directed by the combiner 705 towards the eye box 722 to produce a virtual image, as seen by a viewer, for any given image pixel, is meant to be "collimated" with a target vergence of 0.0 deg.±~20 arcmin. As a result, the viewer can have an augmented reality (AR) or mixed reality (MR) viewing experience.

A benefit of this approach is that with controlled fabrication and placement of the pin-mirrors 730, deflection of image light towards a viewer can be optimized, largely independent of the further optimization of the combiner 705 for allowing transit of ambient or environmental light to a viewer. In particular, by fabricating a combiner 705 with low area-density, but highly reflective imbedded or internal mirror surfaces, whose reflectivity is independent of the inner and outer combiner surfaces, can enable a substantially transparent lens, with the same effective reflection as the typical partially reflective single-surface combiner.

Considering FIG. 7A, the efficiency of directing virtual image light towards a viewer's eye largely depends on the reflectivity (e.g., R~92%) of the pin-mirrors 730, and the apparent high fill factor of both the pin-mirrors 730 and the pin-mirror arrays 735, as seen or experienced by the incoming virtual image light. As seen by the incoming virtual image light, the circular or elliptical pin-mirrors have a fill factor of ~80%, as compared to being square or rectangular mirrors. The apparent fill factor from one pin-mirror array 735 to another, as experienced by the image light, will depend on the optimized array positioning, manufacturing tolerances, and the stability or robustness of the product thereafter. Assuming an apparent array fill factor of ~92%, and not including optical absorption of the slices or substrate, and Fresnel losses or AR coatings at the surfaces, the overall optical efficiency of the pin-mirror array can be estimated as ~0.92*0.8*0.92≈0.68, which can be a significant improvement over existing ARHS light guides. By comparison, with respect to the incident ambient light, the pin-mirrors 730 are sparsely located and small, and the apparent fill factor is low (e.g., ≤20%, and preferably ≤10%). Therefore, the pin-mirrors 730 and pin-mirror arrays 735 can be optimized within a combiner 705 and a light guide based ARHS, to improve both image quality and a light efficiency or high fill factor for the virtual image light (745), with little impact on a high light efficiency or low fill factor for the ambient light (760). Other efficiency optimizations, including for nominally equal ambient and image light through the pin-mirror array efficiencies (e.g., ~75% each), or for image light efficiency being higher than ambient light efficiency, can be favored, depending on the application.

The improved combiners 705, with pin-mirrors 730 also can provide some of the benefits of pin-hole glasses, for a user viewing the projected virtual image content. As previously discussed, pin-hole technology reduces the blur circle by filtering out some of the light waves. This is similar to the effect that is realized when a person squints their eyes to improve vision. Squinting reduces the size of the de-focus light rays that land on the retina. Pinhole glasses include a series of small holes within an opaque visor that allows only a portion of the light to pass through and enter the pupil of the eye. The pin-mirrors 730 can have an analogous effect for viewing of the virtual image content. The effective size of the pin-mirrors 730 is increased by the pinhole optics effect, which both increases the depth of field and provides a wide eye box. The apparent resolution that can be achieved by a pin-mirror 730 with a diameter of D, is roughly 1.97/D arc minutes.

In the case of the AR headset 700 of FIG. 7A-D, the image generating optics 750 and associated input coupler optics 755 can be located to the left or right or the viewer's eyes, near the temples, with the imager and associated optics positioned along the side of the viewer's head. Alternately, the input coupler and imager and associated optics can be located above the viewer's eyes, near the forehead, so that image light is coupled into the combiner at or near the upper edge. In this case, as shown in FIG. 8, each of the imbedded pin-mirrors 830 are generally oriented with a vertical tilt to direct the image light towards an eye.

Aspects of the fabrication of the combiners were previously discussed with respect to FIGS. 4-7. In greater detail, it should be understood that the inner surface and outer surface (i.e. respectively 727 and 728 in FIG. 7A), to provide a functional light guide, whether fabricated with or without a substrate (i.e. substrate 440 in FIG. 4A, should be nominally parallel. In the preferred design, the assembled light guide or combiner or eyepiece is flat, with only modest wedge (e.g., ≤0.1°. Also, the spatial flatness of the individual outer surfaces (i.e. 727 and 728 respectively in FIG. 7A) of the light guide eyepiece or lightguide visor should be flat to roughly λ/4, which is 138 nm, for a wavelength of 550 nm. A preferred thickness tolerance for exemplary light guide combiners is ~±0.20 mm. A 60-40 surface quality would be tolerable. If a substrate is included, it should nominally be made with the same material, whether glass or plastic, as the slices in the various embodiments. The exemplary visors can also be fabricated with an outer frame (not shown), similar as to that for a pair of eyeglasses, to help hold the slices together.

The various exemplary improved light guide combiners can also be fabricated by casting or injection molding, for a relatively low cost. By comparison, a typical waveguide combiner with diffraction grating light couplers has a coating or texture on one or both of the inner and outer combiner surfaces, to create a partially reflective element, but these coatings or textures also reduce the transparency of the element. This results in a tradeoff between transparency and reflectivity, and never quite fulfills either requirement.

In an exemplary embodiment, the structure of a combiner or visor can be attached by fusing or joining two or more slices together with a mirror mesh sandwiched between them. In another embodiment, this may be achieved by creating small holes penetrating the surface of the visor to a particular depth, and then depositing mirrors within the holes. As a non-limiting example, gallium could be injected into the holes in a liquid state and once solidified, they could be used as mirrors. It should be appreciated that these are simply exemplary techniques that can be used to create embodiments of the visor or combiner and should not be construed as a limitation.

It should be appreciated that while FIGS. 4A-7D may seem to suggest that the individual micro-mirrors and rows or linear arrays of micro-mirrors are fabricated across a combiner on parallel planes of planar edge facets, that those skilled in the art will understand, as depicted in FIG. 8, that the combiner 805 can provide a spatially variant tilt of the pin-mirrors 830 or pin-mirror arrays 835 across the combiner 805. Relative to the light input edge or input light coupler, and the inner and outer surfaces of the combiner 805, the mirror facets 825 can be tilted at spatially variant angles across the light propagation length of the combiner. For example, near the virtual image light input end of the combiner 805, the pin-mirrors 830 can be tilted at a nominal angle of Ø1 (i.e. 47° as a non-limiting example), while in the center region of the combiner 805, nearest the eye box 820, the pin-mirrors can be tilted at the nominal angle of Ø2 (i.e., 45° as a non-limiting example), and at the far end of the combiner 805, furthest from the input end, the pin-mirrors can be tilted at the nominal angle of Ø3 (i.e., 43° as a non-limiting example). An optimization with a spatial tilt variation of the pin-mirrors 830 provides an additional degree of design freedom that can ease the optical design of the imaging optics, or the combiner design and fabrication specifications. Also, if the improved ARHS 800 has an eyepiece or combiner with tilted pin-mirrors (FIG. 8) or tilted pin-mirror arrays (see FIG. 5A, 5B and FIG. 14), and the pin-mirror coatings are reflective dichroic notch coatings, than the pin-mirror tilt or combiner curvature can help compensate for the spectral shifts that occur when dichroic coatings are tilted. Alternately, the notch position of the dichroic coatings can be deposited to vary spatially across the combiner so that the apparent notch spectral position to the eye box appears constant. The widths of the pitch 832, or of the gaps between the pin-mirrors 830, can also be optimized spatially across a combiner 805 (e.g., optimizing the spatial frequencies). Although the size, shape, and tilt of the actual pin-mirrors 830 can be optimized to vary spatially across a combiner, a goal can be that the apparent pinhole size, as seen by a viewer, is nominally constant (e.g., within ±15% of average) across the combiner. The optimization of these parameters can also benefit optical efficiency, in terms of how much virtual content image light can be reflected towards the eye box, and thus also the potential sizes of the pin-mirrors. For example, if spatial tilt optimization allows smaller mirrors, then transmission or transparency for ambient light can be increased. Also, the size and positioning of the eye box 822 can be improved with spatial optimization of the pin-mirrors 830, to either side and to the top and bottom. The preferred range for the size of the eye box 822 is 10-15 mm.

Additionally, in any of the embodiments but described with regards to the embodiment in FIG. 8, the imbedded edge facets 825 on which the pin-mirrors 830 are fabricated, and indeed the entire combiner 805, can also be fabricated to have a curvature, which can be concave or convex, and symmetrical or asymmetrical (e.g., cylindrical). For example, the entire light guide or combiner 805 can have a curvature, or compound curvature, oriented inwards towards the eye. Thus, the facets 825 of the slices 810 upon which the pin-mirrors were fabricated can also have curvature. Alternately, the combiner 805 or light guide can be a flat device with nominally plane parallel surfaces, but one or more facets 825 upon which the reflective mirror coatings are fabricated, can be fabricated with a curvature, resulting in a curvature for a pin-mirror array 835. The individual pin-mirrors 830 can also have a localized curvature or scalloping on a facet 825 that either is otherwise nominally flat or which has its own curvature with a much larger radius. Curving the individual pin-mirrors 830 or the facets 825 can provide additional design freedom for the entire optical design, including that of the image generating optics 850. For example, a large radius of curvature (e.g., ≥150 mm), or small optical power, that is either concave or convex, can be used. The pin-mirrors 830 can also have a spatially variant curvature, for example where the pin-mirrors 830 proximate to the eye box 822 are flat, and the pin-mirrors 830 nearest the sides or edges can be optimized with curvature. Curvature of the pin-mirrors 830 can be useful to help correct for spherical or chromatic aberration, or to modify or assist the collimation of image light towards the eye box. As an example, a design for an improved light guide type AR headset 800 with a pin-mirror based combiner can provide aspheric or free-form lens elements that work in combination with pin-mirrors 830 that are fabricated with spatially variant tilts, widths, shapes, or curvatures.

In a design with multiple curved pin mirrors, each pin mirror can contribute part of the imaging function of the micro-display. However, if these curved pin-mirrors don't belong to a whole large curve, the generated sections of the image may not be combined seamlessly and different twists of the image portions can happen, meaning that the perceived image has a local or spatially variant and unintended distortions. One way to reduce or avoid image twist is to have each curved pin mirror belong to one identical or common large curved surface imbedded within the combiner (each pin mirror is a part of a whole large curved mirror).

Figure 9D:
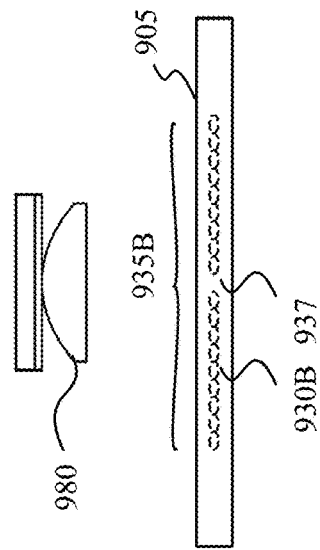
FIG. 9D is a top-pan view of the pin-mirror based light guide AR headset of FIG. 9A with the pin-mirrors in a different configuration.
Figure 9B:
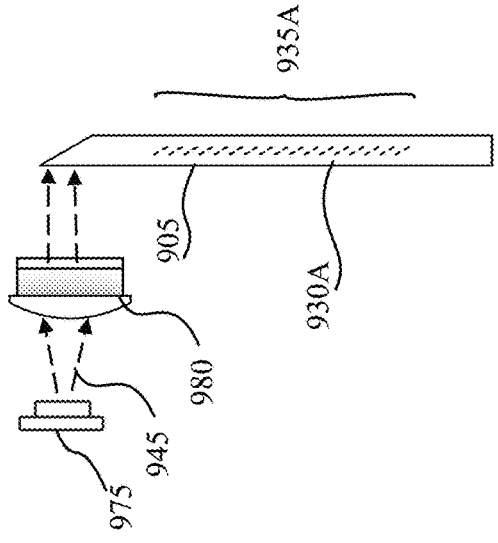
FIG. 9B is a side elevational view of the pin-mirror based light guide AR headset of FIG. 9A.
Figure 9C:
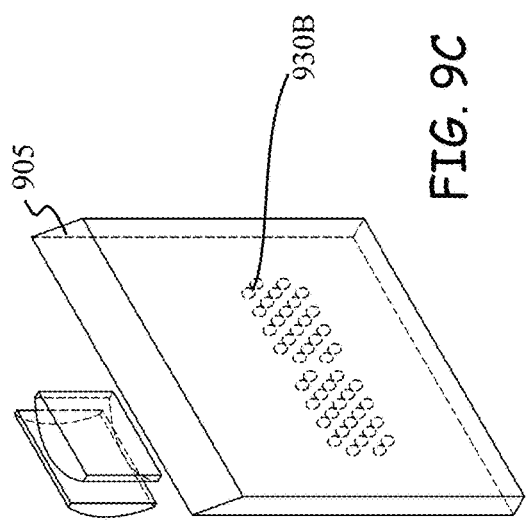
FIG. 9C is a perspective view of the pin-mirror based light guide AR headset of FIG. 9A with the pin-mirrors in a different configuration.
Figure 9A:
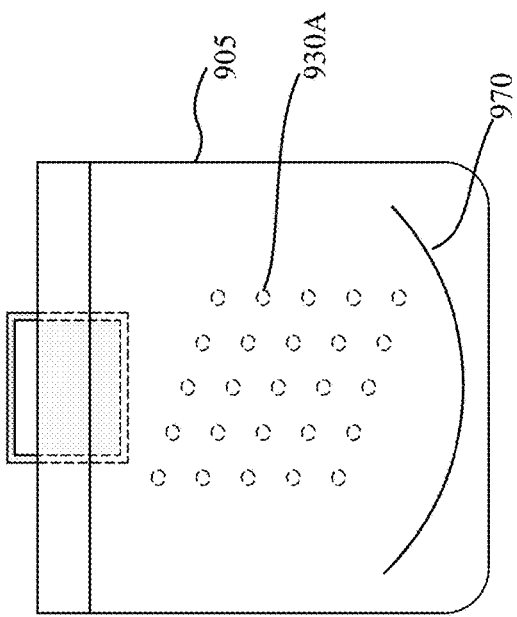
FIG. 9A depicts a second improved approach for a pin-mirror based light guide AR headset having a dual light guide and a curved reflector.

Alternate versions of an improved light guide based ARHS with imbedded pin-mirrors 930 are shown in FIGS. 9A-E. In particular, in the version shown in FIG. 9A, a large curved mirror 970 is provided near the bottom of the combiner or "eyepiece" 905 that can function to collimate the beams along the horizontal plane of the eyepiece. The AR headset can be equipped with image generating optics 950 that includes an LED array 975 that emits virtual image light 945, and beam shaping optics (i.e., lenses 980) that alter the light and direct it into a light guide combiner 905. In the exemplary embodiment that is shown, a first cylinder lens nominally collimates the image light from pixels in the LED array 975 in the narrow (4 mm wide) direction of the light guide. FIG. 9E depicts a perspective view, showing light propagation for three field positions. The light will reflect off an input coupling edge facet (915) and be directed into the elongate portion of the light guide combiner 905. In this orientation, the image light will propagate in part by TIR through the light guide 905. In the orthogonal orientation, a second cylinder lens (980) can alter the image light from being divergent to convergent, before the image light encounters the input coupling edge facet 915. A preferred configuration for this system is to provide the LED array 975 and associated optics above the eyes, so image light is directed from the forehead downwards into the combiner 905.

Then, as shown in FIGS. 9A-E, a design for a visor 900 provides a combiner 905 with flat pin mirrors 930, but with a large cylindrical curved mirror 970 near the bottom of the eyepiece/combiner 905. Once the light has propagated through the length of the light guide combiner 905, it can hit an imbedded cylindrical curved reflector 970 and be reflected back, and then become nominally collimated in the wide direction of the light guide combiner 905. After collimation by the large curved mirror 970 at the bottom of the combiner 905, the beams are reflected back to the eyepiece and then can hit the array of pin mirrors 930A or 930B (collectively referred to as 930) and reflect out of the eyepiece and towards an eye box 922 where a human eye can view a virtual image at infinity. As an example, a light guide with a 60×50 mm size, and a thickness of 4 mm, has a curvature for the large curved reflector 470 of ~30 mm, so as to modify or collimate the virtual image light for the horizontal field of view within the eyepiece.

In the prior configuration of FIG. 7A-D, the pin-mirrors 730 were tilted to face the incoming image light and deflect it towards the eye box 722. But in the FIG. 9A-9E configurations, the pin-mirrors 930 or micro-mirrors can be tilted to face (e.g., at 30° the curved mirror 970, so as to re-direct light reflected from the curved mirror 970 towards the eye box 922. This means that during an initial transit of image light through the light guide combiner 905 towards the curved reflector 970, some image light can encounter the "back side" of the pin-mirrors 930, and be deflected outwards, towards the ambient environment, where this light may be noticed by other people. To reduce this effect, the pin-mirrors 930 can be fabricated with a "back side" light absorption coating (e.g., ≥97% light absorbing). Similar black or light absorbing coatings can be provided on the light guide edges, including portions of the edge facet 915 that are not used for coupling input virtual image light 945 into the light guide combiner 905, so as to attenuate stray light and prevent its observance by either a viewer or people in the ambient environment.

It is also noted that the curved reflector 970, rather than being imbedded, can be provided as a mirror coating applied to a curved end face of the light guide or combiner 905. It is also noted that FIGS. 9A-E depict two versions, relative to the arrangement of the pin-mirrors 930 into an array. In one version (FIGS. 9A-9B), the pin-mirrors 930A are distributed in a pin-mirror array 935A that spans most of the area of the light guide combiner 905. In a second version (FIGS. 9C-9D), the pin-mirrors 930B are tightly clustered in a spatially variant pin-mirror array 935B with two adjacent groups, with a partial gap 937 between them. The partial gap 937 is used prevent light loss in the center fields and allow more light from the center field to propagate through to the curved mirror 970 and then to pin mirrors 930.

The pin mirrors 930 are used to couple out the light reflected from the curved reflection surface (970) in the waveguide. As an example, 2 mm wide pin-mirrors 930 tilted at 30 deg. will seem only 1 mm tall. An optimized pin-mirror array design can use only 20-100 pin-mirrors 930. With more pin mirrors 930 occupying a larger area, the amount of coupled out light will be larger, and thus the image brightness can increase. However, there are other trade-offs. As one example, the eye relief, or the distance between the eye box 922 and the improved light guide combiner 905, or eyepiece, can be reduced. The system has a finite working distance, as given by a distance between the curved reflector 970 and its exit pupil (e.g., the location of the eye box 922). Thus, the further the pin mirrors 930 are from the curved reflector 970, the smaller the corresponding eye relief will be. Based on this, the pin mirrors 930 cannot be too far "above" or away from the curved reflector 970. Second, to expand the array area given to the pin mirrors 930, can block more ambient light. These, and other trade-offs can be addressed during the optimization process of the pin mirrors 930, by determining factors including the number, size, positions, and the ambient and virtual image light fill factors, of the pin mirrors 930. Advantageously, this version of the improved light guide based ARHS 900 with imbedded pin-mirrors 930 and curved reflector 970 can be optimized to present virtual image light 945 to an eye box 922 over a horizontal FOV of at least 100 degrees.

In the improved light guide and pin-mirror based ARHS shown in FIGS. 9A-E, the light propagates through a single light guide, to reach the curved reflector 970, and then to reach pin-mirrors 930. Alternately, the image light could be initially coupled into a first light guide (not shown) that is nominally parallel to, but slightly offset from, by a thin air gap, a second light guide having the pin-mirrors. The two light guides merge or are contacted with an index matching material in the region proximate to the curved reflector, so that image light can then be directed towards the pin-mirrors. A random arrangement of spacer beads or posts can be used to maintain the air gap between the light guides. While this configuration can be mechanically more complicated, virtual image light is not lost by encountering the back side of the pin-mirrors.

FIG. 10A depicts a viewer's eye receiving virtual image light from part of an AR headset having pin-mirrors. FIG. 10B depicts a viewer's eye receiving virtual image light from part of an AR headset having pin-mirrors. FIG. 10C depicts a viewer's eye receiving virtual image light from part of an AR headset having pin-mirrors. For greater context, FIG. 10A depicts a 3D or isometric view of a viewer's eye 1001 receiving virtual image light rays 1045 from part of an improved AR headset 1000 having pin-mirrors 1030. Image light is coupled into the planar inner surface of the light guide combiner 1005, and reflected off of an angled edge facet towards the pin-mirrors 1030. In particular, this image depicts part of an ARHS with a curved bottom reflector of FIG. 9A-E.

The "screen-door door" effect is normally denoted as when the fine lines separating pixels become visible. This can be solved by increasing the resolution of the display. In the heads-mounted display, the "screen-door" effect can occur because a single display is stretched to provide a large field of view and the fine lines between pixels become more visible. As the individual pin-mirrors are both small and close to the eye, they are unlikely to cause a significant screen door effect. If the pin mirrors 1030 were larger, they would need to be further away from each other so as not be seen. Additionally, there is a risk of perceptible moiré occurring. But for this light guide ARHS, as long as different layers or rows of pin mirrors 1030 do not overlap with each other, a "moiré pattern" is unlikely to occur. Also, given the relatively large size and pitch of the pin mirrors 1030 and pin mirror arrays 1035 (mm dimensions), compared to the size of the projected image pixels, visible moiré between the pin-mirror arrays and the image content is unlikely. Additionally, the physically positioning or pitch 1032 or shape of the individual pin-mirrors 1030 430 in the pin-mirror array or sub-arrays can be randomized to reduce the risk of perceptible moiré.

In general, the introduction of pin-mirrors in the combiner provides many additional degrees of freedom for designing the visor, the imaging generating optics, and the AR headset. In particular, a variety of parameters, including pin-mirror size, shape, tilt and spatial tilt variation, gap spacing or pitch, pin-mirror or facet curvature, and overall combiner curvature can become available.

Figure 11:
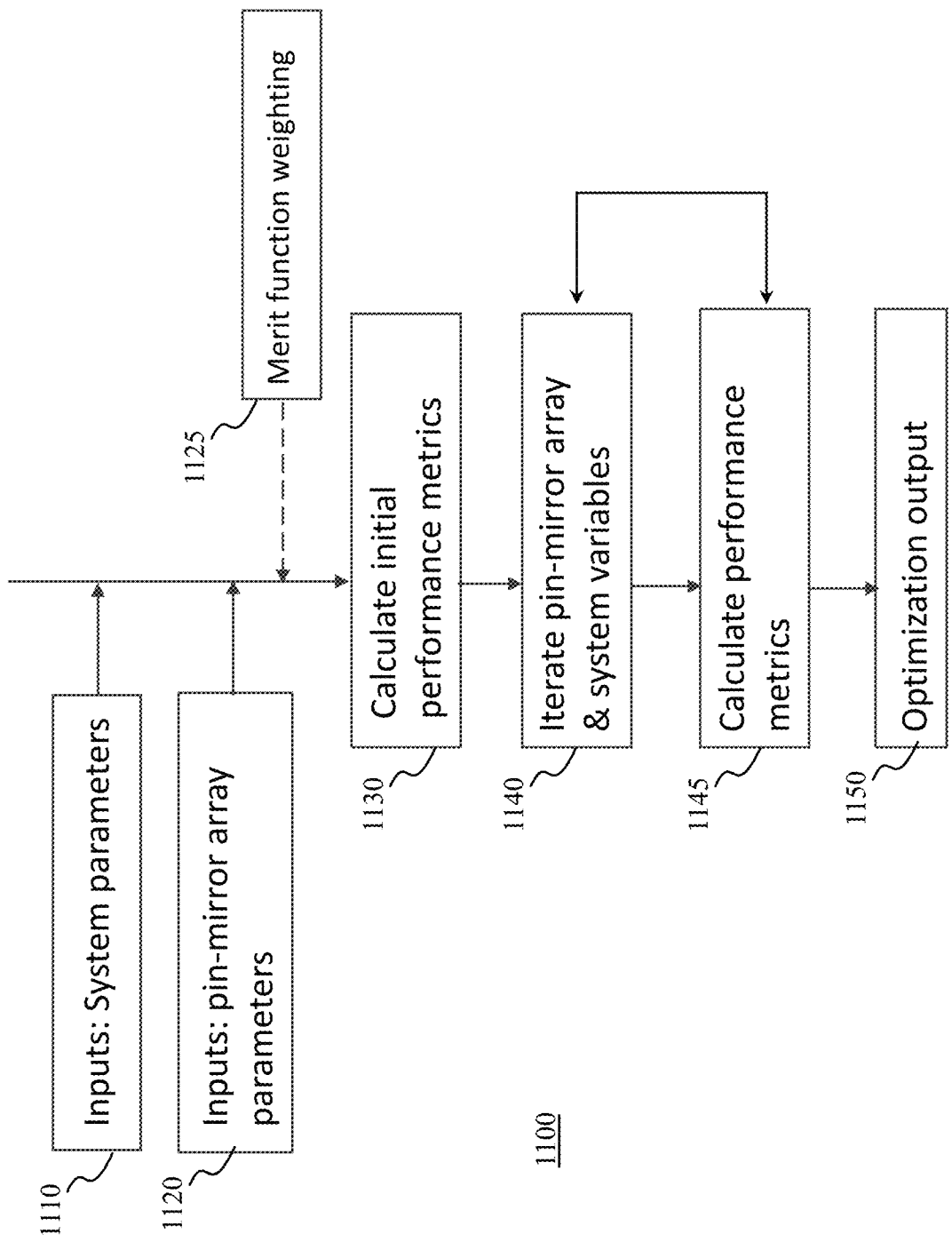
FIG. 11 is a flow chart illustrating an exemplary optimization method for designing combiners or eyepieces for AR headsets having a plurality of pin-mirrors.

FIG. 11 outlines an optimization method 1100 that can be used to design the plurality of pin-mirrors, a combiner, and an AR headset generally (including the displays of FIGS. 7A-D, FIGS. 9A-E, FIGS. 10A-C, FIGS. 12-13, and FIGS. 14-15). In an initial input step 1110, values or ranges for input parameters related to the general design of the combiner and light guide are provided, along both relevant parameters related to the imaging optics and input light coupling optics, and the parameters related to illuminating a viewer's eye with image light. These system parameters (P) can include at least the target FOV, the light guide and combiner or visor size, the light guide thickness, the eye box size and position, and the eye relief. In a second initial input step 1120, values or ranges for parameters specific to the pin-mirrors and pin-mirror portion of the combiner are provided. These pin-mirror parameters (P) can include the minimum pin-mirror size (to guarantee manufacturability, and reduce image blur), the maximum pin-mirror size (to avoid pupil focus), the maximum or nominal pin-mirror spacing (to ensure optical overlap), the minimum pin-mirror array size (to ensure minimum eye box size), the maximum pin-mirror array size (to fit in an eye glass lens), the pin-mirror array shape or outer contours, and the pin-mirror coating (both reflective and light absorbing) performance. Other input parameters (P) can include the length of a pre-pin-mirror light guide portion, the pin-mirror array fill factors (e.g., a high fill factor for the virtual image light and a low fill factor for the ambient light), the facet or pin-mirror tilt, multi-plane pin mirror array parameters (FIG. 5A: e.g., the extent of the sub-arrays, pitch between sub-arrays, parallelism or relative skew or tilt between the sub-arrays, the pin-mirror positioning within the individual sub-arrays, and the avoidance of moiré), facet or pin-mirror curvature, and the spatial variation of a facet or pin-mirror tilt or curvature in either a horizontal or vertical direction. Although the pin-mirror arrays and sub-arrays are depicted as having the pin-mirrors arranged within a nominally rectangular area, the outside shape or contour of the pin-mirror arrays need not be rectangular. In particular, the pin-mirror array area contours can also be optimized using appropriate parameters so that the array outer edges more closely follow the edges of the eye piece, which can be curved and shaped to better fit to the contours of a viewer's face. Using the parameters that are input in steps 1110 and 1120, then initial system performance metrics can be calculated in step 1130, and compared to target values.

An iterative optimization process than follows, via steps 1140 and 1145, in which values for the input parameters can be modified and new performance values calculated and tracked. This optimization process can use a damped least squares method, a global optimization method, or other calculative techniques. Depending on the algorithmic optimization approach, an additional step 1125 can be included to provide user defined or automatic weighting values that can be used in optimization merit function (e.g., $M=A_1P_1W_1+A_2P_2W_2+A_3P_3W_3+\ldots$). The weighting factors (W) can be applied to both the system or pin-mirror parameters (P) and the system performance metrics (A). The optimization method 1100 then nominally ends at an output step 1150, which provides "final" optimized values for the various parameters, as well system performance values for the performance metrics. The performance metrics determined in steps 1130 and 1145 can include image brightness, image light efficiency, image color or intensity uniformity, image blur or image resolution (MTF), field of view and eye box size, and ambient light transmission or transparency. Of course, also, the input parameters and merit function weightings can be changed and the method re-run.

The optimization can be separated into the optimization of projection optics and the optimization of the size and arrangement of the pin mirrors. Optimization or design of the projection optics can be completed by using sequential mode in Zemax or CodeV without considering the outcoupling of the lightguide eyepiece (pin mirrors) and can be achieved by operating the merit function. Whereas, optimization of the size and arrangement of the pin mirrors can be completed in design software by setting each pin mirror as a detector that can detect how much total power is reflected to be coupled out of the lightguide eyepiece and the individual power reflected corresponding to each single field of light. By doing this, the relationship between the size and placement of the pin mirrors, the total reflected power, and the reflected power for each field, can be set up and evaluated, to determine an optimal number of pin mirrors, the pin mirror size(s), and the pin mirror placement. In practice, in the various embodiments the optimization of the pin-mirrors and combiner can inform or limit the optimized design of the imaging optics, and the design of the imaging optics can inform or limit the optimization of the pin-mirrors and combiner. In general, the preferred fill factors can vary with the ARHS design and fabrication, coating properties, and the expected viewer applications.

In the prior discussions, it is generally assumed that the visors or combiners for the left and right eyes would have identical optimizations, except that for any spatial variations, one combiner would be a mirror image of the other. However, for some application specific purposes, or for a customer specific design, the visors or combiners can be optimized differently, as can the associated imaging systems.

FIG. 14 depicts an alternate embodiment for an improved light guide based AR headset 1400 having a combiner 1405 with an array of pin-mirrors 1430. In particular, FIG. 14 depicts a line scanning AR display system that can be used for left eye or right eye viewing, in which an image source 1440 (e.g., a micro-LED array) provides image light 1445, via collimation and projection optics 1410, a scan mirror 1420, through a lightguide or combiner 1405 having pin-mirrors 1430 arranged on a plurality of pin-mirror sub-arrays 1435, to an eye 1460 at an eye box 1450. Optics 1410 can be refraction, diffraction, reflection, or electrical-controlled diffraction based, or combinations thereof. The visor or lightguide combiner 1405 can also be shaped and contoured to improve the fit to a viewer's face.

Figure 15:
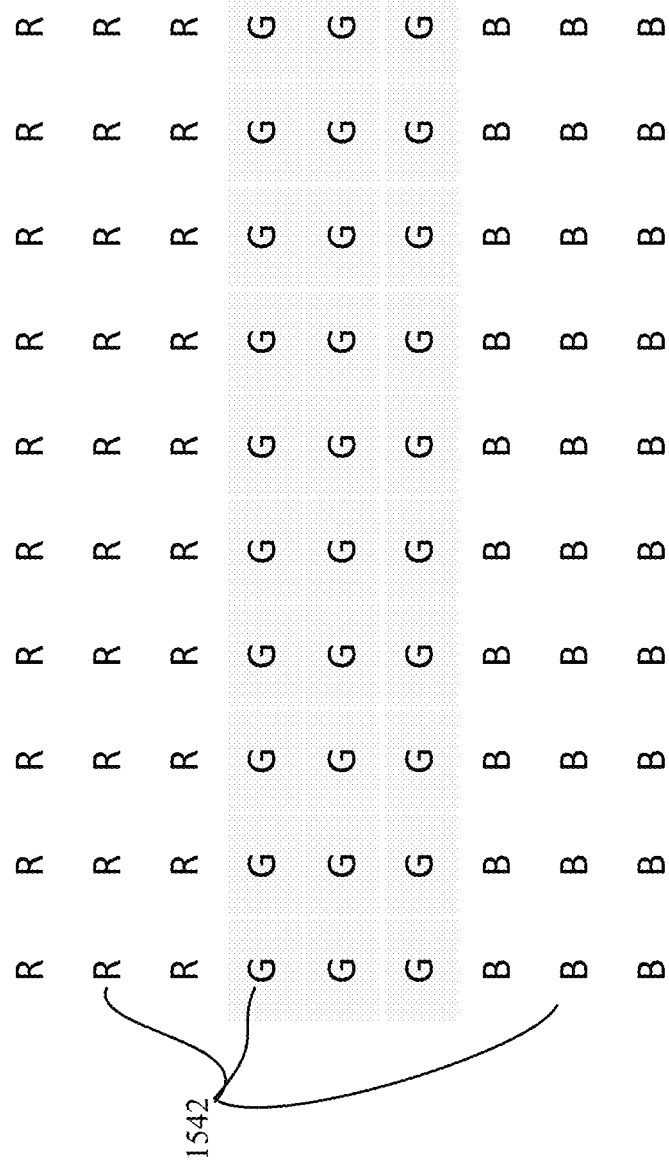
FIG. 15 depicts a portion of a pixelated tri-linear image source for use in providing a scanning image light source.

It is noted that at present, it can be difficult to fabricate and source small, bright 2D micro-LED arrays 1440 with tightly packed addressable RGB image pixels (1542 see FIG. 15). As an alternative, a tri-linear RGB LED array light source can be used. For example, the LED array source can be a true 1D tri-linear array that provides a line of addressable LED pixels having 1×4096 red light emitting pixels, parallel to a similar respective rows of green light and blue light emitting pixels. Alternately, as shown in FIG. 15, the image source 1540 can be a device that can be described as a 2D micro-LED array or block-width tri-linear micro-LED array. In particular, FIG. 15 depicts a portion of an LED array device with an arrangement of LED pixels as three linear areas or blocks such that a parallel linear array of Red (R) pixels 1542 is adjacent to a parallel linear array of Green (G) pixels 1542, that is adjacent to a parallel linear array of Blue (B) pixels 1542. For example, each block or linear array of pixels, whether R, G, or B, can comprise 50×8000 pixels. The LED emitters in a given line (e.g., 50 pixels wide) are individually addressed and controlled, and at any point in time, during scanning and image display, they can be providing an intensity of image light for different details of the displayed AR image content. This second approach, with a block-width tri-linear micro-LED array, enables embodiments of the ARHS to provide a brighter image.

Within a linear micro-LED array light source 1540, individual light emitting pixels 1542 can also be square or rectangular in aspect ratio. As an example, an individual light emitting pixel, whether R, G, or B can have a nominal side dimensions of 2.5-5.0 microns width, although the pixels can be smaller (e.g., 1.0 microns wide) or larger. Each block or linear array of pixels, whether R, G, or B, can comprise 8000×50 pixels. Thus, for example, with 3.2 micron square pixels, each of the respective color arrays would be 160 microns wide, and 25.6 mm long, to provide an overall linear type device or image source 1540 that is ~0.5 mm wide and 25.6 mm long. The linear arrays of RGB image pixels 1542 in FIG. 15 can be provided with other arrangements of the colors, such R, B, G, and the number and size of image pixels need not be identical from one color array to another. The LED array can also be equipped with micro-optics, such as a lenslet array (not shown), to help with beam shaping. For example, a custom designed micro-lens array, aligned and mounted to collect and redirect light from the LED pixels, can have lenslets with customized shapes, or optical designs that are spatially variant across the LED array or by color (R, G, B). Although FIG. 15 depicts the tri-linear LED Array (1540) as a straight linear RGB device, the device can also be a white light, or monochrome or single-color device, or be curved (along an arc) or shaped. Curving or shaping the array can better match an eyepiece (combiner 1505) in a way that is more conformal to the human facial structure, and increase apparent light efficiency to a viewer.

In either case, a tri-linear micro-LED array 1540 with LED pixels 1542 can be used as an image source 1540 for the improved AR headset 1400 of FIG. 14. The emitted image light is shaped by collimation optics (1410) and directed onto a 1D scanning micro-mirror 1420, through projection optics (1410), and into a combiner 1405 or eyepiece, to then transit the combiner and be directed to the eye box. As shown, this combiner has multiple sub-arrays (1435) of pin-mirrors 1430. This system can provide high brightness AR images to a viewer simultaneously along with the presence of high brightness ambient light 1465. The 1D, 2D or customized scanning system could be provided using a variety of mechanisms, devices, materials, or modulation components, including but not limited to, MEMS devices, solid state displays, spatial light modulators (e.g., back illuminated liquid crystal (LC) devices), modulation crystals, or beam deflectors.

Operationally, the individual R, G, or B LED pixels 1542 can provide emitted light with 8-10 bits of modulation depth, at a display frequency of 30-120 Hz, depending on the application and specifications. Both the modulation bit depth and display frequency can be increased (e.g., to 12-14 bits, and 144-200 Hz, respectively) depending on the available technologies and the value to the ARHS product. This modulated image light 1445 is then directed through optics 1410 to a linear scan mirror 1420, which can be driven by a controller (not shown). The scan mirror 1420 can be either a resonant or non-resonant scanner, with its scan operation calibrated by a line scan position monitoring sensor (not shown). FIG. 14 depicts two tilt positions for this scan mirror, with opposite tilts. Scan mirror 1420 can be a MEMs (microelectromechanical systems) device, for example that is a single mirror with an active mirror 2.5 mm wide and 6 mm long, where the mirror tilts by ±7-10 degrees about the width direction. Improved or optimized devices with either smaller or larger (e.g., ±12°) scan angles can also be used. The optical scan range (angle) is 2× the mechanical scan range (angle). The scan mirror 1420, which can also be designed as a linear array of multiple mirrors, can be provided by vendors such as Preciseley Microtechnology Corp. (Edmonton AB, CA) or Fraunhofer IPMS (Dresden, Del.). Scan mirror 1420 can also be enabled by other technologies, such as a piezoelectric device (e.g., using PLZT) or a galvanometer. As the scan mirror 1420 tilts, the image light 1445 is swept through the light guide combiner 1405, to reflect light off of pin-mirrors 1430, and direct light to an eye box 1450. Image light 1445 can be provided by the LED pixels 1442, in synchronization with the scan mirror 1420 tilt, such that image light 1445 is directed into the eye box 1450 for an extended duration per sweep. As image content can be provided for both directions of scan mirror tilting, the effective operational scanning duty cycle can be high (e.g., ~90%).

A preferred configuration for this system is to provide the image source 1440, associated optics, and scan mirror 1420, at the top, above the eyes, so image light 1445 is directed from the forehead downwards into the combiner 1405. As previously described, a variety of pin-mirror parameters, such as a maximum and minimum size, a pitch or gap between them, and target fill factors can be defined. Then, during optimization, with an optimization method 1100 (FIG. 11), the pitch, size, shape, curvature, tilt, positioning, fill-factors, coatings, and other parameters related the pin-mirrors 1430 and the pin-mirror sub-arrays 1435, including the sub-array pitch 1432, within the combiner 1405 can be optimized. As an example, the 1D scanning AR display system 1400 of FIG. 14 can use an array of pin-mirrors 1430 in which the pin-mirrors have ~0.4-1.2 mm widths, and are spaced apart from one another by a spatially variant pitch (1432) in the ~2-5 mm range, and combiner 1405 can have a total of 300-1000 pin-mirrors 1430 distributed across one or more imbedded pin-mirror sub-arrays 1435. But depending on the design optimization of the pin-mirror based combiner or eye piece 1405, the number of pin-mirrors can be ≤50, or ≥2000, or somewhere in between. The optimization (e.g., FIG. 11) of the configurations of the individual pin-mirrors in the various embodiments and the pin-mirror sub-arrays in the various embodiments, relative to pin-mirror design parameters such as number, size, pitch, curvature, and coatings, and system parameters such as the target headset FOV (e.g., a WFOV ≥90° per eye), can be motivated by many factors or performance metrics, including the lack of visible moiré, the apparent headset transparency for the ambient light, and the apparent brightness for display expected light. Other optimization or performance metrics can include factors that are specific to a given viewer application or to the manufacturability of the pin-mirrors and pin-mirror arrays. The FIG. 11 pin-mirror optimization method can also be a subset of a larger optimization method that includes the design of the entire combiner, or the entire AR headset, including the design of the imaging optics, housings, and various light trapping or light absorbing features.

As shown in FIG. 14, the combiner 1405 used in the improved scanning and light guide based AR headset 1400, which can be straight or curved, can be of the type with multiple planes of parallel sub-arrays of pin-mirrors 1430 (see also FIG. 5A and FIG. 5B). The combiner can have curvature or shaping to help conform to the shape of a viewer's face, and curvature can be provided only outside the area used for image display, or it can extend to within the viewed area. The AR headset 1400 of FIG. 14 can also be provided with pin-mirror based combiners that are of the type with a single laterally spread pin-mirror array using a single light guide (FIG. 7(A-D)), or of the type (FIGS. 9A-E) with dual parallel light guides and a curved reflector (970) at the bottom of the eyepiece, opposite the top side image source.

The 1D scanning, pin-mirror based, AR headset 1400 of FIG. 14 also can be advantageously adjusted for variations in interpupillary distance (IPD) amongst viewers. As an example, the device can be designed so that nominally only 6000 pixels of an available 8000 pixels of an image source array (1440) are used at a given time. But the stripe of used pixels can be selected to shift the images provided by the left eye and right eye scanning displays, to the left or right, so as to adjust for different people's interpupillary distance. This capability can be enabled by a calibration set-up process or with eye tracking.

Figure 12:
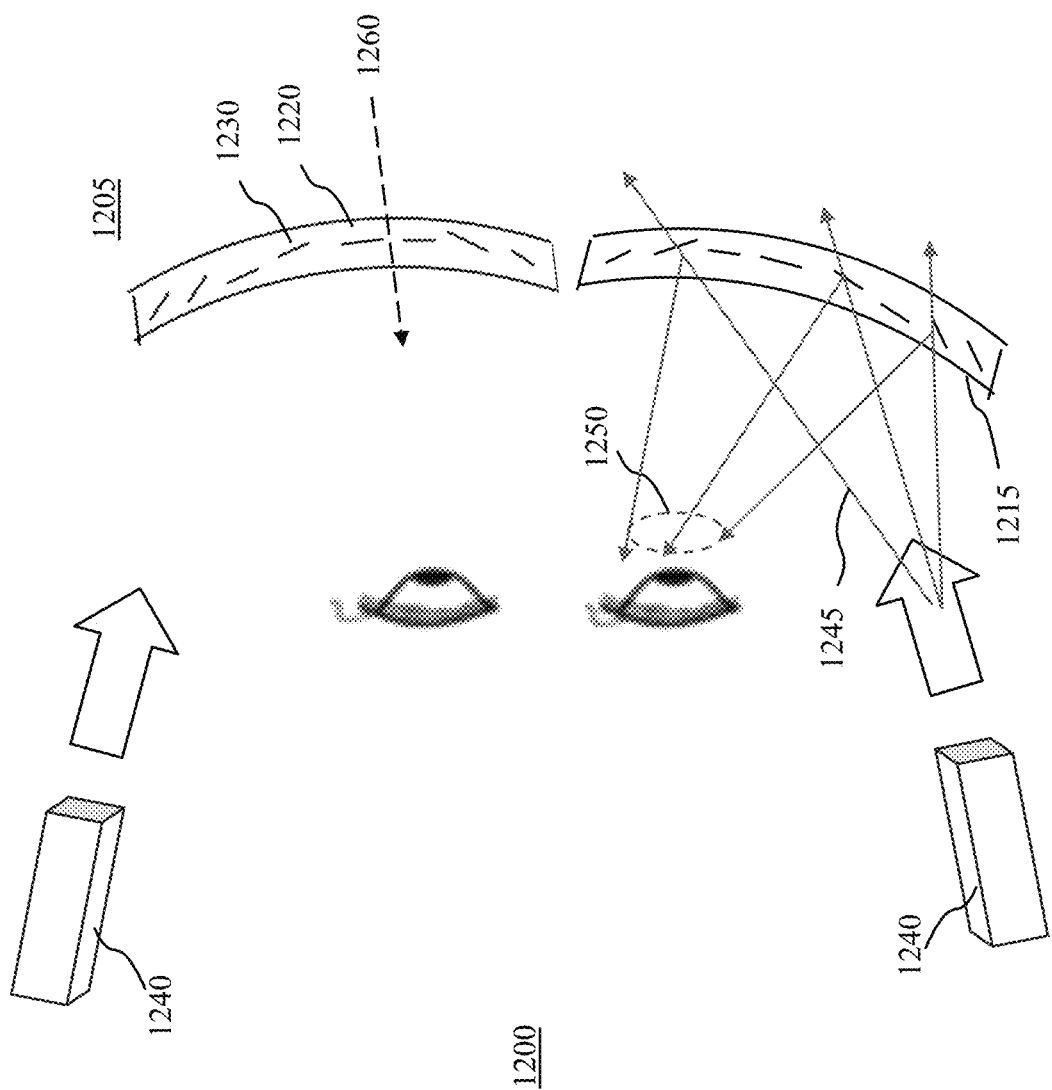
FIG. 12 depicts another improved AR headset, of the projection type, having a plurality of pin-mirrors.
Figure 13:
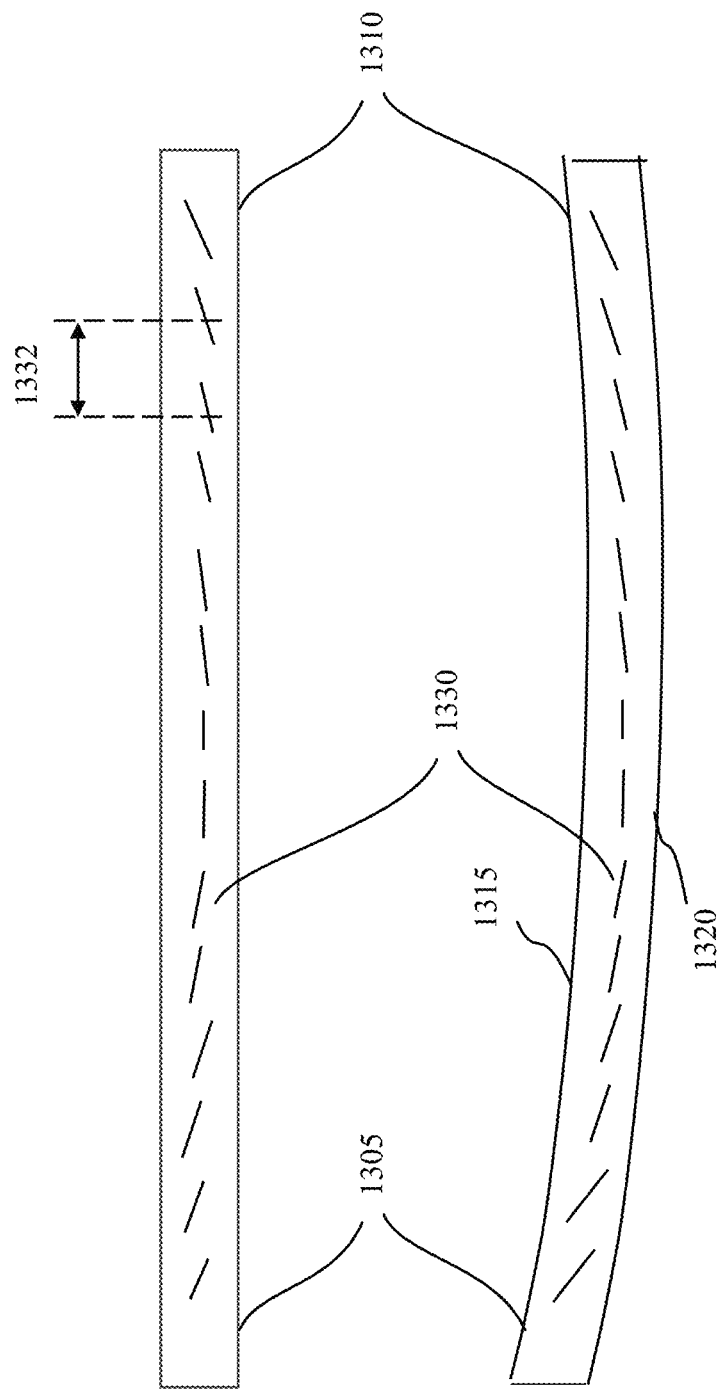
FIG. 13 depicts aspects of the construction of a combiner having a plurality of pin-mirrors.

According to an alternate embodiment of the present invention, the imbedded reflector array of pin-mirrors 1230 can also be used within an improved eyepiece or reflective combiner 1205 for a projection type AR glasses display (1200), but improved over the example depicted in FIG. 3A. As shown in FIG. 12, instead of having a complicated partially reflective coating, the inner surface 1215 of the combiner 1205 will have an AR coating so that the virtual image light 1245 penetrates into the combiner 1205 and interacts with pin-mirrors 1230. As shown in FIG. 13, a combiner 1305 can be fabricated with a combiner substrate 1310 having a plurality of pin-mirrors 1330 with a spatially varying tilt. FIGS. 12 and 13 depict a cross sectional view of a 1D row or array of pin mirrors 1230 and 1330 respectively, arranged to provide a horizontal spatial variance of tilt alignment. More completely, a 2D array of tilted pin-mirrors 1330 is provided both horizontally and vertically over most the height and width of a combiner lens. The combiner 1305 can be manufactured as a flat optic (FIG. 13) using a polymer or a glass material, and then slumped to conform to a curvature, or complex curvature. Alternately, the combiner 1305 can be cast or molded with the pin-mirrors 1330 imbedded within it. Once the combiner 1305 matches the desired shape, it can be AR coated on both the inner surface 1315 and outer surface 1320.

As another option, the combiner 1305 of FIG. 13 can also be fabricated as a Mangin mirror. Mangin mirrors are catadioptric reflectors that are most commonly used in telescopes or printing systems. Typically, a Mangin mirror's construction consists of a concave (negative meniscus) lens made of a crown glass with spherical surfaces of different radii, and with the reflective coating on the shallower rear surface. The spherical aberration normally produced by a simple spherical mirror surface is canceled out by the opposite spherical aberration produced by the light traveling through the negative lens. In the case of the eye piece or combiner 1205 and 1305 of FIGS. 12 and 13, the imbedded pin-mirrors 1330 can be fabricated along a curved inner plane that has a shallower curvature than does the inner surface 1315, so as to provide the reduced spherical aberration benefits. This improvement can, in turn, ease the image quality requirements imposed on the optical design of the projection optics within the imaging systems 1340.

A completed combiner can then be used as combiner 1205 in the improved projection type AR glasses 1200 of FIG. 12, in which it can be used to redirect virtual image light that is incident on the combiner at the inner surface 1215, off the imbedded pin-mirrors 1230 and towards an eye box 1250. Because of the pre-fabricated tilt variation to the pin-mirrors 1230, less curvature can be required of the combiner 1205, or less severe divergent beam angles from the imaging system 1240, or both. Thus, the combiner and/or imaging system can be easier to design into the glasses or provide better performance. Also, this illustrated embodiment also advantageously reduces the blur circle, as size of pin mirrors 1230 within the combiner 1205 can be sized to optimize the amount of light coming from the virtual image generators or imaging systems 1240 and limit the local FOV of that light. This operates to reduce the blur circle and make the image more focused on the retina. As with the system of FIG. 3A, the imaging system 1240 can use an LED with a 2D array of light emitting pixels, and a system of beam shaping optics.

The design of the combiner 1205, for an improved projection type ARHS, can involve parameters including the coatings, size, shape, curvature, pitch or spatial frequency, or tilt of the pin-mirrors 1230, and can be optimized using a design process similar to that of FIG. 11, although the range of tilts used for the pin-mirrors 1230 can be much greater. For example, the pin-mirrors 1230 most proximate, or across from the eye box 1250, can be arranged nominally parallel to the inner and outer surfaces of the combiner 1205. Whereas, the pin-mirrors 1230 closer to a viewer's nose can have a local tilt relative to local curved surface of the combiner 1205 of only 5-10 degrees. Whereas, the pin-mirrors 1230 furthest from a viewer's nose, or closest to the temples, can have a local tilt relative to local curved surface of the combiner 705 of 15-30 degrees, but of opposite orientation or sign to the pin-mirror tilt used near the nose. Although FIGS. 12 and 13 depict combiners with spatially variant pin mirror tilts in the horizontal direction, the spatial variation can be provided in the vertical direction, or simultaneously in both the horizontal and vertical directions. The actual designed spatially variant angles used for the pin-mirrors depends on the designed radius of curvature for the combiner. This curvature is again likely to have a complex or compound shape, but a design goal can be to reduce the radius of curvature to about half of what is was without the benefit of the pin-mirrors while providing a WFOV. For example, the maximum radius for the compound curvature of the combiner 1205 can be reduced to ~20-40 mm, as compared to the 60 mm referenced previously. Use of spatially variant tilt of the pin-mirrors 1230 across the combiner also provides greater freedom to optimize the optical design proximate of the combiner or the imaging optics on the nose bridge side differently than on the temple side. As another example, a design for an improved projection type AR headset 1200 with a pin-mirror based combiner can provide both aspheric lens elements working in combination with pin-mirrors 1230 fabricated with spatially variant tilts or curvatures or shapes.

The pin-mirrors 1230 or micro-mirrors preferably have a circular or elliptical shape. Alternately, the shape or pitch or fill factor of the pin-mirrors 1230 can also vary spatially across the improved reflective combiner 1205. For example, near the combiner, proximate to the eye box 1250, the pin-mirrors 1230 can have a spherical shape, while towards the temples and the nose, the pin-mirrors 1230 can have an elliptical shape. The pin-mirror shape can be optimized towards satisfying a goal that the apparent pin-mirror size, as seen by a viewer, is nominally constant (e.g., within ±15% of average) across the combiner. Pin-mirrors 1230 are nominally provided with a reflectivity of 85-98%, depending on the coating materials used, and the angle of incidence of the virtual image light. The pin-mirror coatings can also be dichroic notch coatings, and a spatially variant tilt of the pin-mirrors, relative to the eye-box (see FIGS. 12-13) can compensate for the dichroic coating spectral shifts that typically occur with varying incidence angle. The pin-mirrors 1230 can also be optimized for a nominal fill factor of 50%, to allow about equal fields and amounts of ARHS image light and ambient light to reach the eye box 1250.

Depending on the design optimization of the combiner 1205 and the overall AR glasses 1200, the angular spread of the image ray fan provided by an imaging system 1240, as incident to the combiner 1205, can also be eased to span a lesser angular extent than previously, all the while at least maintaining a target WFOV of ≥90 deg. This eases the optical design requirements imposed on the imaging systems 1240, enabling these systems to have improved performance, or smaller size, or increased clearance for the transiting virtual image light relative to a viewer's face and head.

As an alternate example of optimization, an inner surface illuminated ARHS with a pin-mirror based combiner 1205 of the type of FIG. 12 can be designed with a flat or nearly flat (e.g., radius ≥200 mm) combiner, imbedded pin-mirrors, and a smaller FOV (e.g., ≤50°). As another alternative, an exemplary combiner can be fabricated with pin-mirrors provided on or near the inner surface, or on or near the outer surface. In the latter case, with the pin-mirrors proximate to the outer surface, the combiner thickness can vary spatially to provide the Mangin mirror reduced aberration benefits. As yet another alternative, the imaging optics can use an LED array with a 1D tri-linear array, or a very rectangular array (aspect ratio ≥10:1) of light emitting pixels, paired with a linear or rectangular mirror or array of addressable micro-mirrors to provide a virtual image light with a linear scanning configuration. These various projection ARHS designs using a plurality of optimized pin-mirrors or pin-mirror arrays, can be enabled using variants of the optimization method of FIG. 11. By comparison to the optimization method 1100 used for light guided ARHS previously outlined with respect to FIG. 11, the optimization method for the visor or combiner for a projection type ARHS may not need all of the same optimization parameters or metrics, but it can need or emphasize others instead.

Thus, the various embodiments of the invention advantageously operate to filter the light from the virtual images and real images. In turn, this reduces the blur circle for both sources and results in the virtual images and the real-world images being more in focus regardless of the depth of the real-world elements. Thus, the foreground and the background elements in the real world remain in focus along with the virtual images. The pin mirrors operate as pin holes for the light rays from the virtual image generators and, they also operate to create actual pin holes for the light rays from the real-world environment. Also, the optical components in these improved pin-mirror based ARHS systems, including image source optics, projection optics, and eyepiece optics, can include optics or components that can include, but are not limited to, optics that are refractive, diffractive, free-form, or Kinoform, Fresnel, combined elements, holographic elements, metasurface or sub-wavelength structured elements, gradient index elements, optomechanical components, spatial light modulators, variable shape membranes, liquid lenses, different display components, or static or electrical controlled crystal materials.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A light guided augmented reality (AR) display comprising:
    an image source; and
    imaging optics, wherein the imaging optics provide an image light;
    a combiner into which the image light is end or edge coupled, and from which the image light is guided and output towards an eye box;
    a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box,
    wherein, with respect to the image light, the tilted pin-mirrors appear to form a high fill factor array, while simultaneously appearing as a low fill factor array for ambient light incident to an outer side surface of the combiner, wherein the size, shape, and tilt of the pin-mirrors are optimized to reduce an image blur.

2. A light guided augmented reality (AR) display comprising:
    an image source; and
    imaging optics, wherein the imaging optics provide an image light;
    a combiner into which the image light is end or edge coupled, and from which the image light is guided and output towards an eye box;
    a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box,
    wherein, with respect to the image light, the tilted pin-mirrors appear to form a high fill factor array, while simultaneously appearing as a low fill factor array for ambient light incident to an outer side surface of the combiner, wherein the size and spacing of the pin-mirrors into a two dimensional pin-mirror array is optimized to increase the optical efficiency for directing the image light to the eye box.

3. A light guided augmented reality (AR) display comprising:
    an image source; and
    imaging optics, wherein the imaging optics provide an image light;
    a combiner into which the image light is end or edge coupled, and from which the image light is guided and output towards an eye box;
    a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box,
    wherein, with respect to the image light, the tilted pin-mirrors appear to form a high fill factor array, while simultaneously appearing as a low fill factor array for ambient light incident to an outer side surface of the combiner, wherein the gaps between rows of the pin-mirrors are arranged into a two dimensional pin-mirror array, and the gap widths are optimized to increase the optical efficiency for the transmission of ambient light towards the eye box.

4. A light guided augmented reality (AR) display comprising:
    an image source; and
    imaging optics, wherein the imaging optics provide an image light;
    a combiner into which the image light is end or edge coupled, and from which the image light is guided and output towards an eye box;
    a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box,
    wherein, with respect to the image light, the tilted pin-mirrors appear to form a high fill factor array, while simultaneously appearing as a low fill factor array for ambient light incident to an outer side surface of the combiner, wherein the tilts of the pin-mirrors, relative to the inner and outer surfaces of the combiner vary spatially across the combiner.

5. A light guided augmented reality (AR) display comprising:
    an image source; and
    imaging optics, wherein the imaging optics provide an image light;
    a combiner into which the image light is end or edge coupled, and from which the image light is guided and output towards an eye box;
    a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the size or shape of the pin-mirrors and the gaps between them, are spatially variant across the combiner.

6. A light guided augmented reality (AR) display comprising:

an image source; and imaging optics, wherein the imaging optics provide an image light;

a combiner into which the image light is end or edge coupled, and from which the image light is guided and output towards an eye box;

a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the plurality of pin-mirrors is provided as multiple sub-arrays of pin-mirrors, each provided on an imbedded surface within the combiner relative to the inner and outer surfaces of the combiner, wherein the arrangement of pin-mirrors or pin-mirror sub-arrays varies spatially across the combiner.

7. A light guided augmented reality (AR) display comprising:

an image source; and imaging optics, wherein the imaging optics provide an image light;

a combiner into which the image light is end or edge coupled, and from which the image light is guided and output towards an eye box;

a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the plurality of pin-mirrors is provided as multiple sub-arrays of pin-mirrors, each provided on an imbedded surface within the combiner relative to the inner and outer surfaces of the combiner, wherein at least one sub-array of pin-mirrors is formed onto an internal curved surface.

8. A light guided augmented reality (AR) display comprising:

an image source; and imaging optics, wherein the imaging optics provide an image light;

a combiner into which the image light is end or edge coupled, and from which the image light is guided and output towards an eye box;

a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the image source includes a trilinear pixelated light emitting array and a scanning mirror device, wherein the arrangement of pin-mirrors or pin-mirror sub-arrays varies spatially across the combiner.

9. A light guided augmented reality (AR) display comprising:

an image source; and imaging optics, wherein the imaging optics provide an image light;

a combiner into which the image light is end or edge coupled, and from which the image light is guided and output towards an eye box;

a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the image source includes a trilinear pixelated light emitting array and a scanning mirror device, wherein the arrangements of the plurality of pin-mirrors within a pin-mirror sub-array is different for at least two sub-arrays.

10. A light guided augmented reality (AR) display comprising:

an image source; and imaging optics, wherein the imaging optics provide an image light;

a combiner into which the image light is end or edge coupled, and from which the image light is guided and output towards an eye box;

a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box, wherein, with respect to the image light, the tilted pin-mirrors appear to form a high fill factor array, while simultaneously appearing as a low fill factor array for ambient light incident to an outer side surface of the combiner, wherein the image source includes a trilinear pixelated light emitting array and a scanning mirror device wherein the image light is coupled into a first light guide to transit the first light guide and reflect off of a curved reflector to enter a second light guide where the image light interacts with the plurality of pin-mirrors.

11. A light guided augmented reality (AR) display comprising:
   an image source; and
   imaging optics, wherein the imaging optics provide an image light;
   a combiner into which the image light is end or edge coupled, and from which the image light is guided and output towards an eye box;
   a plurality of tilted pin-mirrors imbedded between an inner surface and an outer surface of the combiner, where the plurality of tilted pin-mirrors are configured to reflect the guided image light towards the eye box, and wherein the plurality of pin-mirrors include one or more gaps between them wherein the one or more gaps allow the passage of an ambient light through the combiner towards the eye box,
   wherein, with respect to the image light, the tilted pin-mirrors appear to form a high fill factor array, while simultaneously appearing as a low fill factor array for ambient light incident to an outer side surface of the combiner, wherein the image light is coupled into a first light guide, to transit the first light guide, and reflect off of a curved reflector, to enter a second light guide where the image light interacts with the plurality of pin-mirrors.

* * * * *